United States Patent
Sagawa

(10) Patent No.: US 8,944,193 B2
(45) Date of Patent: Feb. 3, 2015

(54) WORKING VEHICLE

(71) Applicant: Iseki & Co., Ltd., Ehime-ken (JP)

(72) Inventor: Noboru Sagawa, Ehime-ken (JP)

(73) Assignee: Iseki & Co., Ltd., Ehime-Ken (JP)

( * ) Notice: Subject to any disclaimer, the term of this patent is extended or adjusted under 35 U.S.C. 154(b) by 0 days.

(21) Appl. No.: 14/187,495

(22) Filed: Feb. 24, 2014

(65) Prior Publication Data

US 2014/0238757 A1  Aug. 28, 2014

(30) Foreign Application Priority Data

Feb. 28, 2013  (JP) .................................. 2013-039195
Dec. 25, 2013  (JP) .................................. 2013-266845

(51) Int. Cl.
*B60K 25/08* (2006.01)
*B60K 17/28* (2006.01)

(52) U.S. Cl.
CPC ....................................... *B60K 17/28* (2013.01)
USPC .................... 180/53.6; 180/53.61; 180/53.62; 180/53.7

(58) Field of Classification Search
USPC ......... 180/53.6, 53.61, 53.62, 53.7, 291, 292, 180/293
See application file for complete search history.

(56) References Cited

U.S. PATENT DOCUMENTS

| | | | | |
|---|---|---|---|---|
| 4,618,016 | A * | 10/1986 | van der Lely | 180/53.6 |
| 6,237,708 | B1 * | 5/2001 | Kawada | 180/53.7 |
| 6,964,310 | B2 * | 11/2005 | Hasegawa | 180/24.09 |
| 7,404,341 | B2 * | 7/2008 | Nishino et al. | 74/331 |
| 7,854,281 | B2 * | 12/2010 | Maezawa et al. | 180/53.6 |
| 2002/0014358 | A1 * | 2/2002 | Osuga et al. | 180/53.6 |
| 2005/0224262 | A1 * | 10/2005 | Ima et al. | 180/53.6 |
| 2006/0196709 | A1 * | 9/2006 | Ishimaru et al. | 180/53.4 |

FOREIGN PATENT DOCUMENTS

| | | |
|---|---|---|
| JP | 2004-196106 A | 7/2004 |
| JP | 2008-95748 A | 4/2008 |

* cited by examiner

*Primary Examiner* — Toan To
(74) *Attorney, Agent, or Firm* — Kenealy Vaidya LLP

(57) ABSTRACT

According to one embodiment, a working vehicle includes: a transmission case including a front transmission case and a rear transmission case, and a power transmission mechanism, arranged in the transmission case, configured to transmit rotating power from an engine to rear wheels or front wheels and transmit the rotating power to an implement mounted to a vehicle body, including: an input shaft; a first switching mechanism configured to switch a rotation corresponding to the rotating power to rotation in advancing direction or reversing direction; a main change speed mechanism; an auxiliary change speed mechanism; a second switching mechanism configured to switch whether to transmit the rotating power to the front wheels or not; and a PTO driving mechanism, wherein a clutch of the first switching mechanism, a clutch of the second switching mechanism and a clutch of the PTO driving mechanism are arranged in the front transmission case.

10 Claims, 25 Drawing Sheets

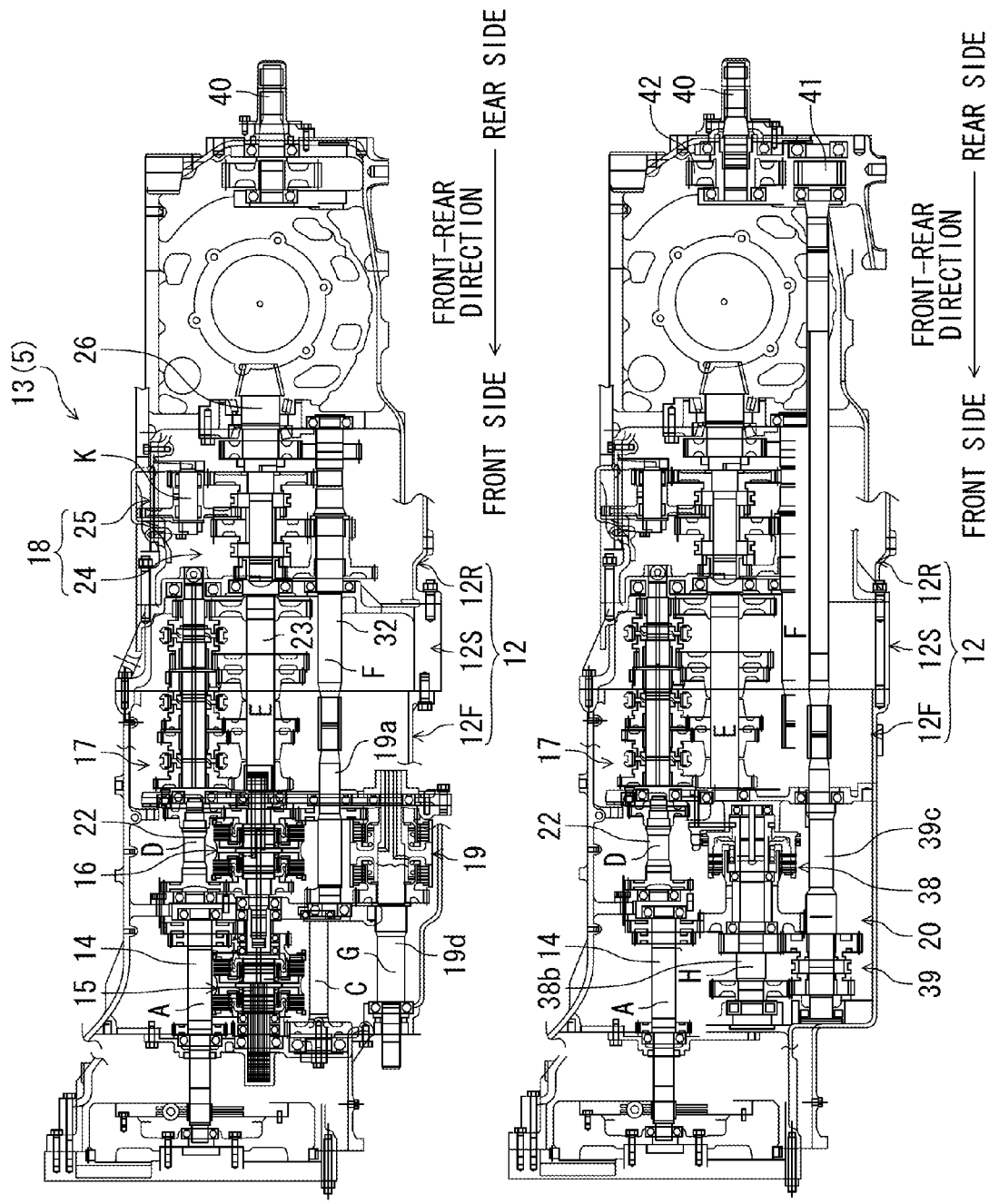
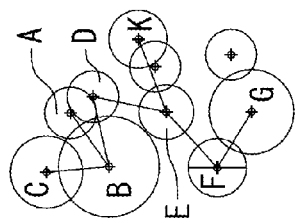
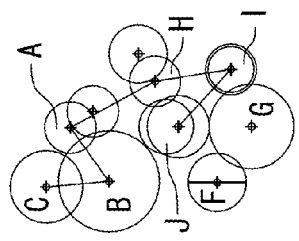
FIG. 7A
FIG. 7B

FRONT SIDE ← FRONT-REAR DIRECTION → REAR SIDE

WORKING VEHICLE

BACKGROUND

1. Field of the Invention

The invention relates to a working vehicle such as an agricultural tractor.

2. Description of the Related Art

Regarding a working vehicle of the related art, for example, JP-A-2004-196106 discloses a configuration of a hydraulic circuit of a power vehicle including an engine mounted on a vehicle body having front wheels and rear wheels, a transmission case, in which a transmission having driving mechanisms including a variety of clutches and gear mechanisms for speed-changing a rotational speed of the engine to appropriate rotational speeds of the front and rear wheels in accordance with a traveling state, is accommodated, and a hydraulic pump for supplying an operating oil to the various driving mechanisms, wherein a decompression valve, which introduces a high-pressure oil from the hydraulic pump through an external oil passage and divides and outputs the same into a specified pressure and a surplus pressure, is provided on one sidewall of the transmission case, a first control valve (a 4WD valve) is attached to the decompression valve, a second control valve (a main change valve, a Hi-Lo switching valve) and a third valve (a reverser valve, a valve for automatic turning) are provided on the other sidewall of the transmission case and a supply oil passage to the first control valve, the second control valve and the third control valve is connected to a specified pressure-side oil passage of the decompression valve.

Also, JP-A-2008-95748 discloses a transmission of a tractor speed-changing and transmitting power from a driving source to driving wheels, which transmission has a main shift shaft, a pair of advancing and reversing hydraulic clutch mechanisms, two sets of first and second change speed mechanisms of a gear synchronizing type and a pair of first and second hydraulic clutch mechanisms. In this case, the main shift shaft is arranged in parallel with an input shaft. The pair of advancing and reversing hydraulic clutch mechanisms is arranged on the input shaft and switches a rotating direction of power transmitted to the main shift shaft. The two sets of first and second change speed mechanisms of a gear synchronizing type are arranged on output-sides of the pair of advancing and reversing hydraulic clutch mechanisms. The pair of first and second hydraulic clutch mechanisms is arranged on output-sides of the two sets of first and second change speed mechanisms and switches disconnection/connection of power transmitted from each of the two sets of first and second change speed mechanisms.

The first to third control valves of JP-A-2004-196106 are arranged on left and right side surfaces of the transmission case in a front-rear direction. That is, they are arranged on outer sides of the transmission case at positions corresponding to the hydraulic clutches provided in the transmission case. However, since the hydraulic clutches are arranged at proper positions of a power transmission mechanism in the transmission case, the first to third control valves are arranged in the front-rear direction, in many cases.

Therefore, the oil passage formed in the transmission case is also formed at various front and rear positions of the transmission case and a piping of the valves is lengthened, so that it is not easy to arrange the valves on the side surfaces of the transmission case. Also, it is necessary to long arrange the hydraulic pump at a side of the engine with respect to the control valves on the side surfaces of the transmission case, which has room for improvement.

According to the transmission of the tractor disclosed in JP-A-2008-95748, the advancing and reversing hydraulic clutch mechanisms are provided at an upstream side and the first and second hydraulic clutch mechanisms are provided at a downstream side with the main change speed mechanism being interposed therebetween, so that a main change speed multistage are implemented. However, JP-A-2008-95748 is the same as Patent Document, in that the hydraulic clutches are separated and arranged at the front and rear sides, which has room for improvement.

SUMMARY

An object of the invention is to provide a working vehicle capable of planning an improvement on manufacturing and improving general versatility.

According to a first aspect of the invention, there is provided a working vehicle including: front wheels; rear wheels; an engine; a transmission case including a front transmission case and a rear transmission case, and a power transmission mechanism, arranged in the transmission case, configured to transmit rotating power from the engine to the rear wheels or the front wheels and transmit the rotating power to an implement attached to a vehicle body, the power transmission mechanism including: an input shaft; a first switching mechanism configured to switch a rotation corresponding to the rotating power to rotation in advancing direction or reversing direction; a main change speed mechanism; an auxiliary change speed mechanism; a second switching mechanism configured to switch whether to transmit the rotating power to the front wheels or not; and a PTO driving mechanism, wherein a clutch of the first switching mechanism, a clutch of the second switching mechanism and a clutch of the PTO driving mechanism are arranged in the front transmission case.

The first switching mechanism 15 is arranged at the engine 4-side with respect to the power transmission path, so that the clutches C1, C2 of the first switching mechanism 15 are intensively arranged at the front transmission case 12F at an upstream side of the power transmission path than the auxiliary change speed mechanism 18 or main change speed mechanism 17, together with the clutches C6, C7 of the second switching mechanism 19 and the clutch C5 of the PTO driving mechanism 20.

According to a second aspect of the invention, in the working vehicle of the first aspect, the power transmission mechanism may be provided with a high-low change speed mechanism, and a clutch of the high-low change speed mechanism may be arranged in the front transmission case.

According to a third aspect of the invention, in the working vehicle of the second aspect, the rotating power may be transmitted through the input shaft connected to an output-side of the engine, the first switching mechanism, the high-low change speed mechanism, the main change speed mechanism, the auxiliary change speed mechanism and the second switching mechanism in corresponding order to drive the rear wheels or the front wheels.

According to a fourth aspect of the invention, in the working vehicle of the second aspect, at least one of the clutch of the first switching mechanism, the clutch of the second switching mechanism, the clutch of the PTO driving mechanism or the clutch of the high-low change speed mechanism may be a hydraulic multiple disc clutch, and clutch valves for control of the hydraulic multiple disc clutch may be arranged on a side surface of the front transmission case.

By the above configuration, it is possible to intensively arrange the clutches C1, C2, C5, C6, C7 and the clutch valves 55, 56, 57, 64 for control thereof at the front transmission case 12F.

According to a fifth aspect of the invention, the working vehicle of the fourth aspect may further include a gear pump provided on a side surface of the front transmission case. The gear pump 70 is arranged closely to the clutch valves 55, 56, 57, 64 for control, so that the connection to an oil passage formed in the front transmission case 12F is easily made.

According to a sixth aspect of the invention, in the working vehicle of the fifth aspect, the gear pump may be driven by the rotating power transmitted through the input shaft and a gear group.

According to a seventh aspect of the invention, the working vehicle of the sixth aspect may further include a transmission shaft for PTO gearshift input, configured to transmit the rotating power to a PTO transmission mechanism of the PTO driving mechanism, and the clutch of the PTO driving mechanism may be provided between the PTO input gear and the transmission shaft.

According to an eighth aspect of the invention, the working vehicle of the fourth aspect may further include a fuel tank provided on a side of the front transmission case. The clutch valves 55, 56, 57, 64 for control and the gear pump 70 of the front transmission case 12F are surrounded and protected by the fuel tanks 65L, 65R positioned at outer sides.

According to a ninth aspect of the invention, the working vehicle of the fourth aspect may further include: a gear pump provided on a side surface of the front transmission case; and a fuel tank provided on a side of the front transmission case.

According to a tenth aspect of the invention, the working vehicle of the first aspect may further include a spacer case, provided between the front transmission case and the rear transmission case of the transmission case, including a metal part configured to supporting gearshift shafts of the main change speed mechanism and a transmission shaft of the second switching mechanism.

The gearshift shafts 22, 23 and the transmission shaft 32 are supported by the metal part 12Sa of the spacer case 12S between the front transmission case 12F and the rear transmission case 12R, so that it is possible to omit a metal configuration at the front-side of the rear transmission case 12R.

According to the invention defined in the first to third aspects, the first switching mechanism 15 and the Hi-Lo change speed mechanism 16 are arranged at the engine 4-side as regards the power transmission path. Thereby, it is possible to intensively arrange the clutches C1, C2, C3, C4 configuring the first switching mechanism 15 and Hi-Lo change speed mechanism 16 at the front transmission case 12F of a more upstream side of the power transmission path than the auxiliary change speed mechanism 18 or main change speed mechanism 17, together with the clutches C6, C7 of the second switching mechanism 19 and the clutch C5 of the PTO clutch mechanism 38. Hence, it is possible to arrange the clutches C1, C2, C3, C4 at the front transmission case 12F in a relatively high-rotating area, so that it is possible to miniaturize the apparatus. Additionally, the clutches C6, C7 of the second switching mechanism 19 and the clutch C5 of the PTO driving mechanism 20, which is operated in conjunction with the input shaft 14, are mounted to the front transmission case 12F, so that it is possible to intensively make the protection configuration and to easily perform a maintenance operation.

According to the invention defined in the fourth aspect, it is possible to intensively arrange the hydraulic multiple disc clutches C1, C2, C3, C4, C5, C6, C7 and the clutch valves 55, 56, 57, 65 for control thereof at the front transmission case 12F and to intensively configure the oil passage in the front transmission case 12F, so that it is possible to effectively perform the processing and manufacturing and the mounting of hydraulic devices.

According to the invention defined in the fifth to seventh aspects, the gear pump 70 is arranged closely to the clutch valves 55, 56, 57, 64 for control, so that the connection to the oil passage formed in the front transmission case 12F is easily made.

According to the invention defined in the eighth and ninth aspects, the clutch valves 55, 56, 57, 64 for control and the gear pump 70 of the front transmission case 12F are surrounded and protected by the fuel tanks 65L, 65R positioned at outer sides.

According to the invention defined in the tenth aspect, the gearshift shafts 22, 23 and the transmission shaft 32 are supported by the metal part 12Sa of the spacer case 12S between the front transmission case 12F and the rear transmission case 12R, so that it is possible to omit or simplify a metal configuration at the front-side of the rear transmission case 12R.

BRIEF DESCRIPTION OF THE DRAWINGS

The present invention will become more fully understood from the detailed description given hereinbelow and the accompanying drawing which is given by way of illustration only, and thus is not limitative of the present invention and wherein:

FIG. 7A is a sectional view showing a traveling-system power transmission mechanism of the transmission of the tractor according to an illustrative embodiment, and FIG. 7B is a sectional view showing a PTO-system power transmission mechanism of the transmission of the tractor according to an illustrative embodiment;

DETAILED DESCRIPTION OF THE INVENTION

Figure 1:
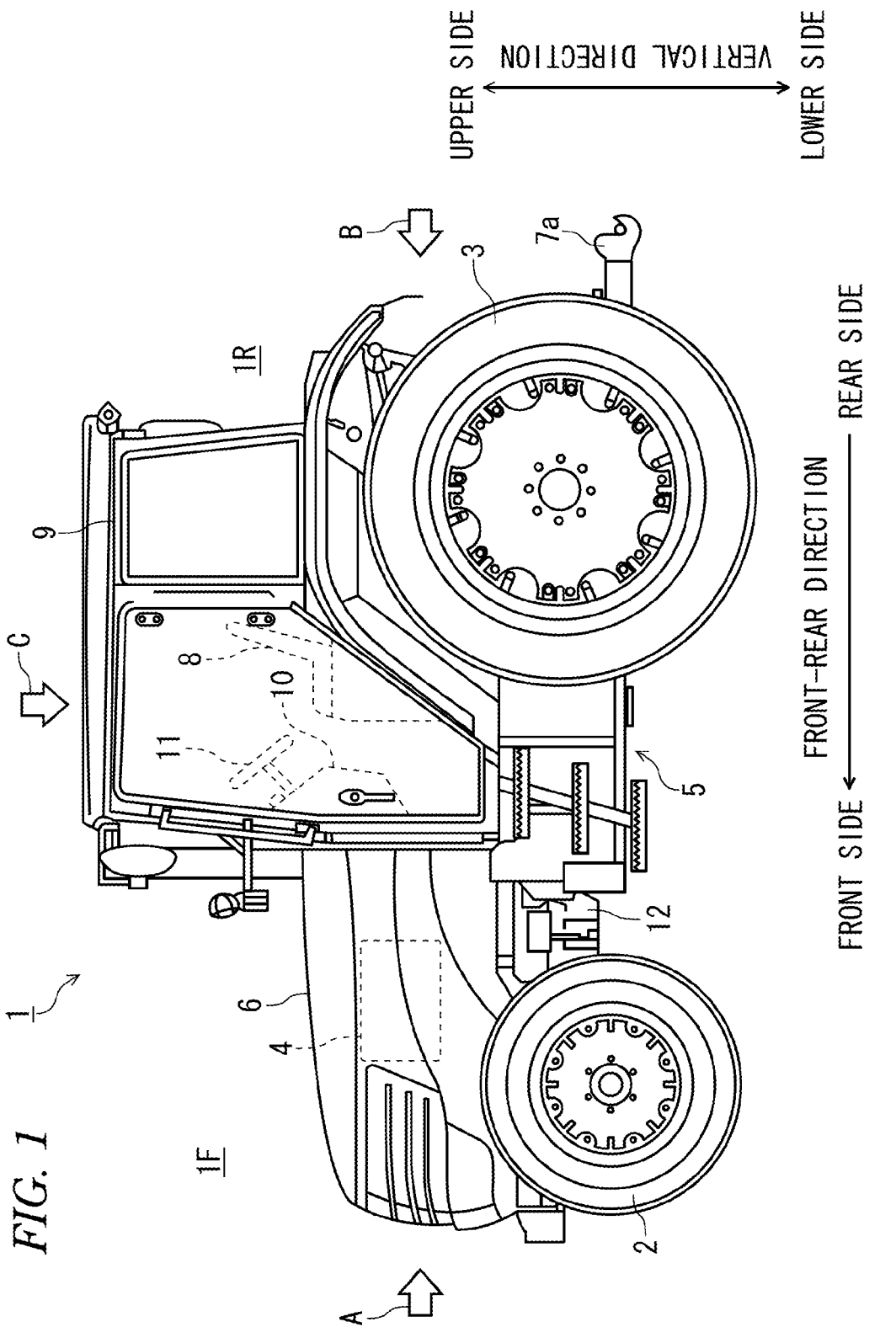
FIG. 1 is a schematic view of a tractor according to an illustrative embodiment
Figure 2:
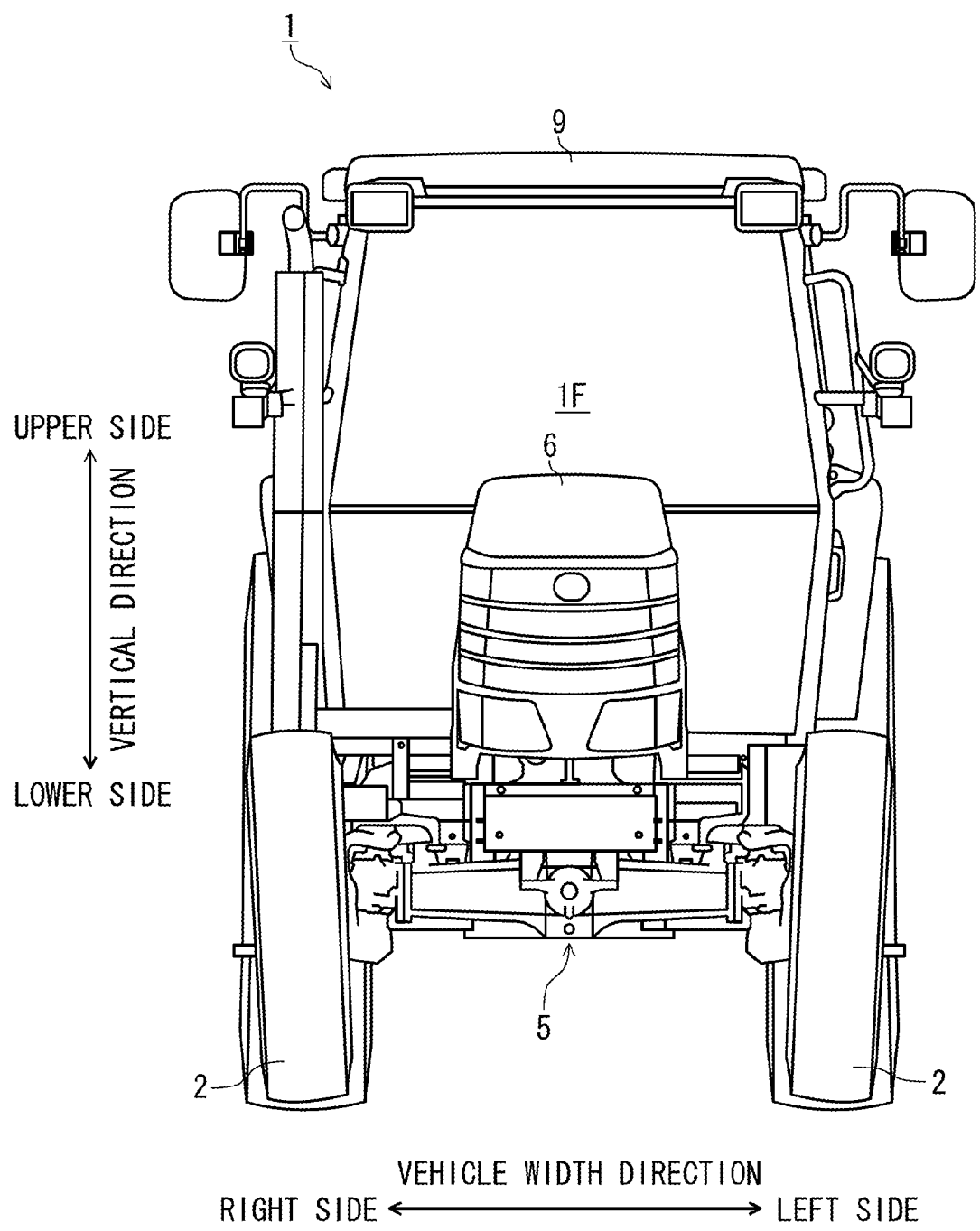
FIG. 2 is a view seen from an A arrow direction of FIG. 1 (a view showing a vehicle body front side part)
Figure 3:
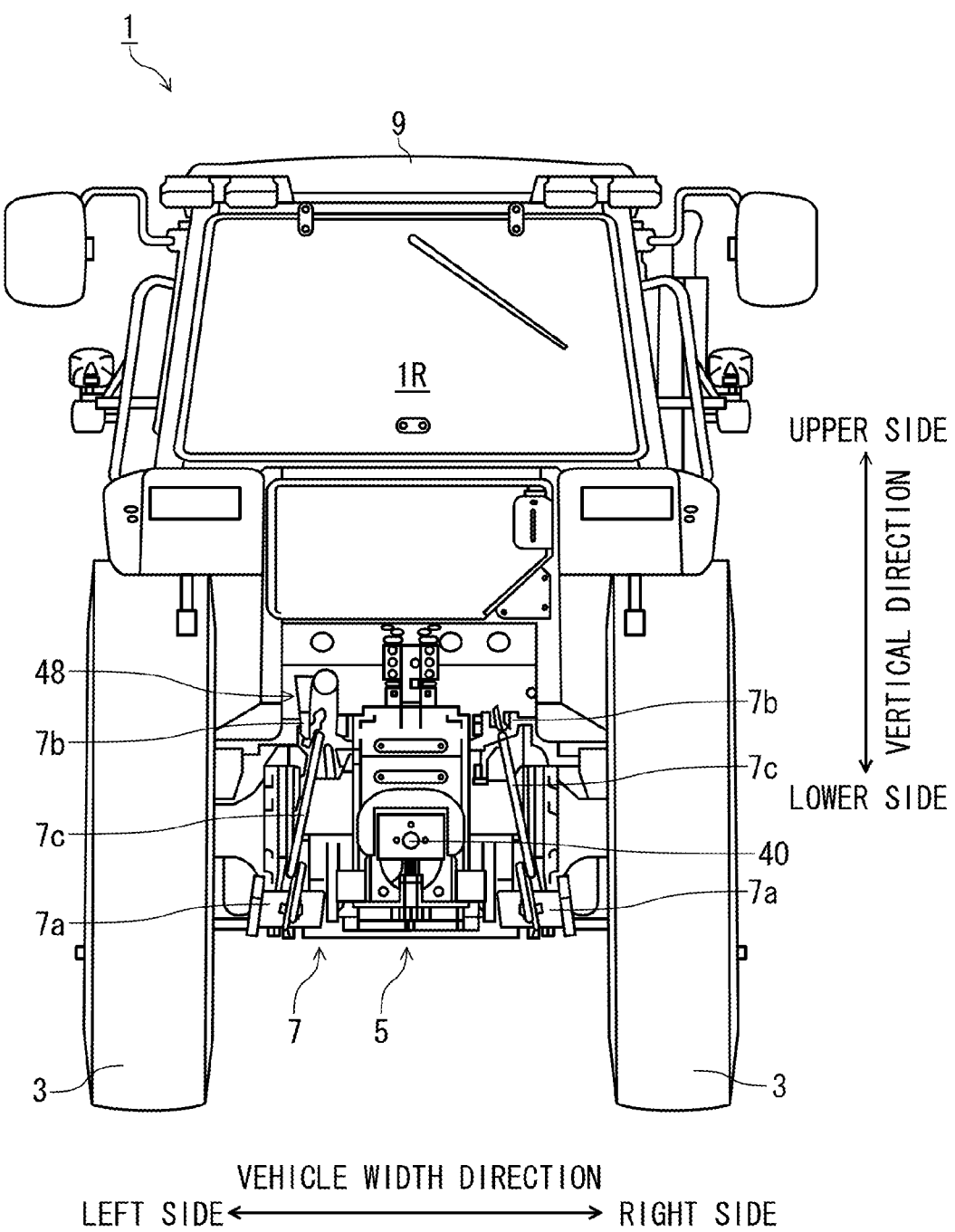
FIG. 3 is a view seen from a B arrow direction of FIG. 1 (a view showing a vehicle body rear side part)
Figure 4:
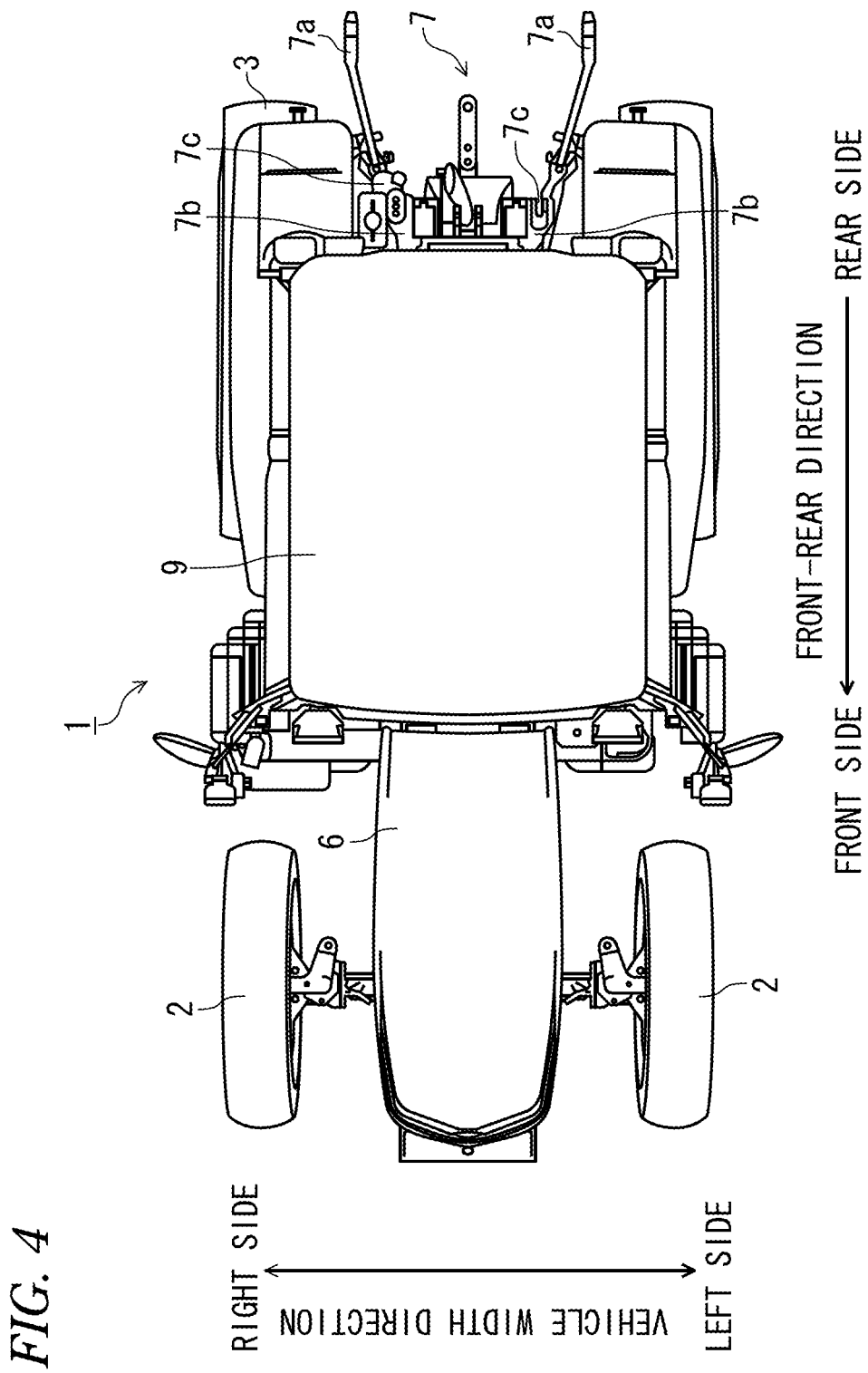
FIG. 4 is a view seen from a C arrow direction of FIG. 1 (a view showing a vehicle body upper part)

Hereinafter, an illustrative embodiment of the invention will be specifically described with reference to the drawings.

Meanwhile, in below descriptions, a front-rear direction is a front-rear direction of a tractor 1. Additionally, the front-rear direction is a traveling direction when the tractor 1 goes straight ahead, and a front side of the traveling direction is referred to as a front side in the front-rear direction and a rear side thereof is referred to as a rear side in the front-rear direction. The traveling direction of the tractor 1 is a direction that is directed from an operator seat 8 of the tractor 1 towards a steering wheel 11 when the tractor 1 travels in a straight line, and the steering wheel 11-side is the front side and the operator seat 8 is the rear side. Also, a vehicle width direction is a direction horizontally orthogonal to the front-rear direction. Here, at a state of seeing the front side of the front-rear direction, the right side is referred to as a right side in the vehicle width direction and the left side is referred to as a left side in the vehicle width direction. Also, a vertical direction is a direction orthogonal to the front-rear direction and the vehicle width direction. The front-rear direction, the vehicle width direction and the vertical direction are orthogonal to one another.

The tractor 1 shown in FIGS. 1 to 4, which is a working vehicle of an illustrative embodiment, is a working vehicle such as an agricultural tractor that is self-propelled by power generated by a driving source and is used for work in a farm field and the like, such as an agricultural tractor. The tractor 1 has front wheels 2, rear wheels 3, an engine 4 that is a driving source and a gearshift apparatus (change speed device) 5. The front wheels 2 are provided mainly as wheels for steering, i.e., steering wheels. The rear wheels 3 are provided mainly as wheels for driving, i.e., driving wheels. The rear wheels 3 are adapted to appropriately decelerate rotating power, which is generated in the engine 4 mounted in a bonnet 6 of a vehicle body front side part 1F, in the change speed device 5 and to transmit the same and generates a driving force by the rotating power. Also, the change speed device 5 is adapted to transmit the rotating power generated in the engine 4 to the front wheels 2, as required. In this case, the four wheels of the front wheels 2 and the rear wheels 3 are driving wheels and generate a driving power. That is, the change speed device 5 is adapted to switch between a two-wheel driving and a four-wheel driving and can decelerate the rotating power of the engine 4 and transmit the decelerated rotating power to the front wheels 2 and rear wheels 3. Also, the tractor 1 has a connection apparatus 7, to which an implement such as rotary (not shown) can be connected, at a vehicle body rear side part 1R. The connection apparatus 7 is a three-point link consisting of left and right lower links 7a and a central top link (not shown) and connects the implement to the vehicle body rear side part 1R of the tractor 1. The tractor 1 rotates left and right lift arms 7b by a hydraulic pressure to thereby move up and down the implement through a lift rod 7c, the lower links 7a connected to the lift rod 7c, and the like. The tractor 1 is configured so that surroundings of the operator seat 8 on the vehicle body are covered by a cabin 9. The tractor 1 is configured so that a steering wheel 11 is provided to stand from a dashboard 10 at the front side of the operator seat 8 and a variety of operation pedals such as a clutch pedal, a brake pedal, a foot throttle pedal and the like and a variety of operation levers such as an advancing and reversing lever, a gearshift lever and the like are arranged around the operator sear 8 in the cabin 9.

Figure 5:
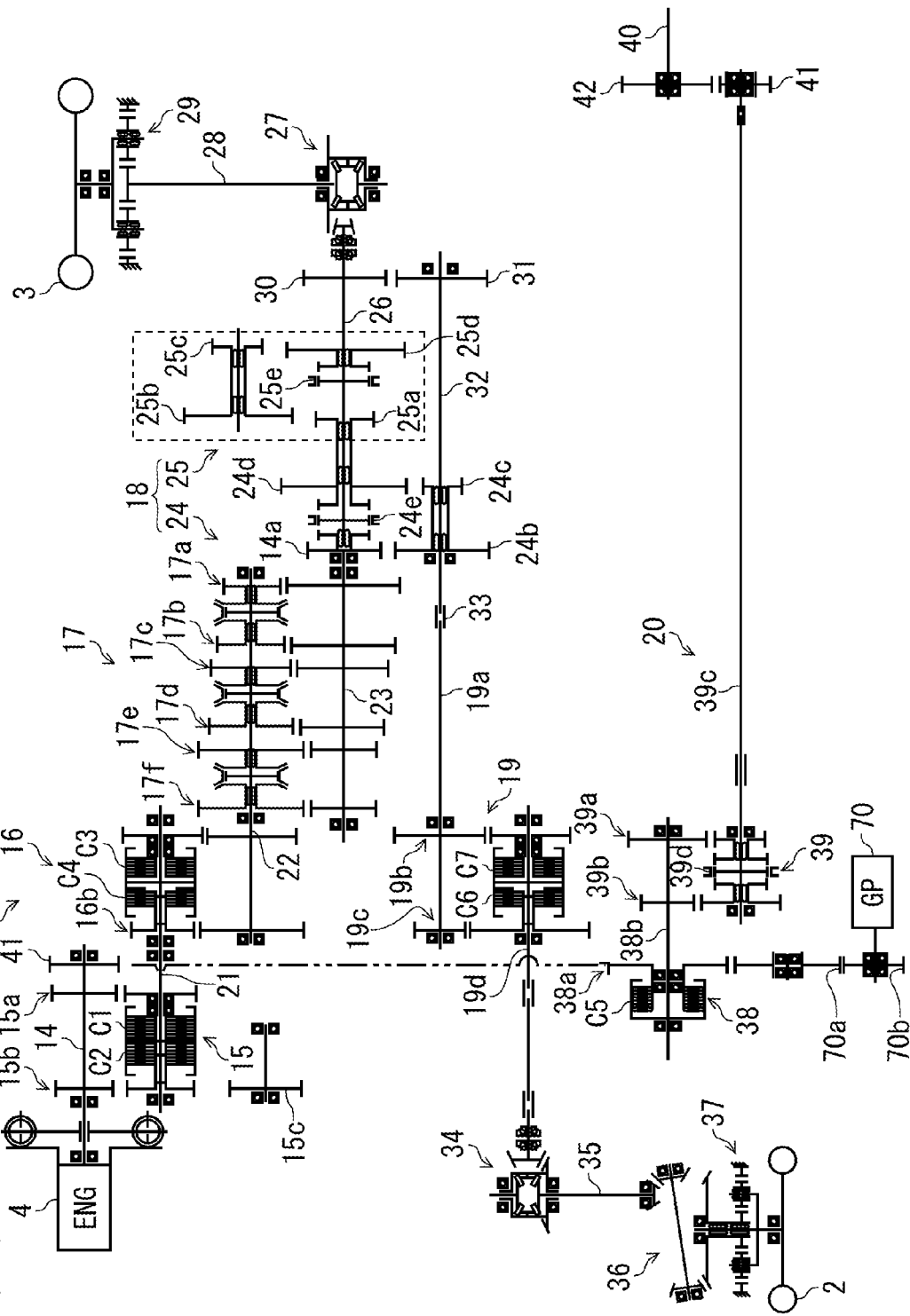
FIG. 5 is a line diagram showing a power transmission mechanism of a transmission of the tractor according to an illustrative embodiment.
Figure 6:
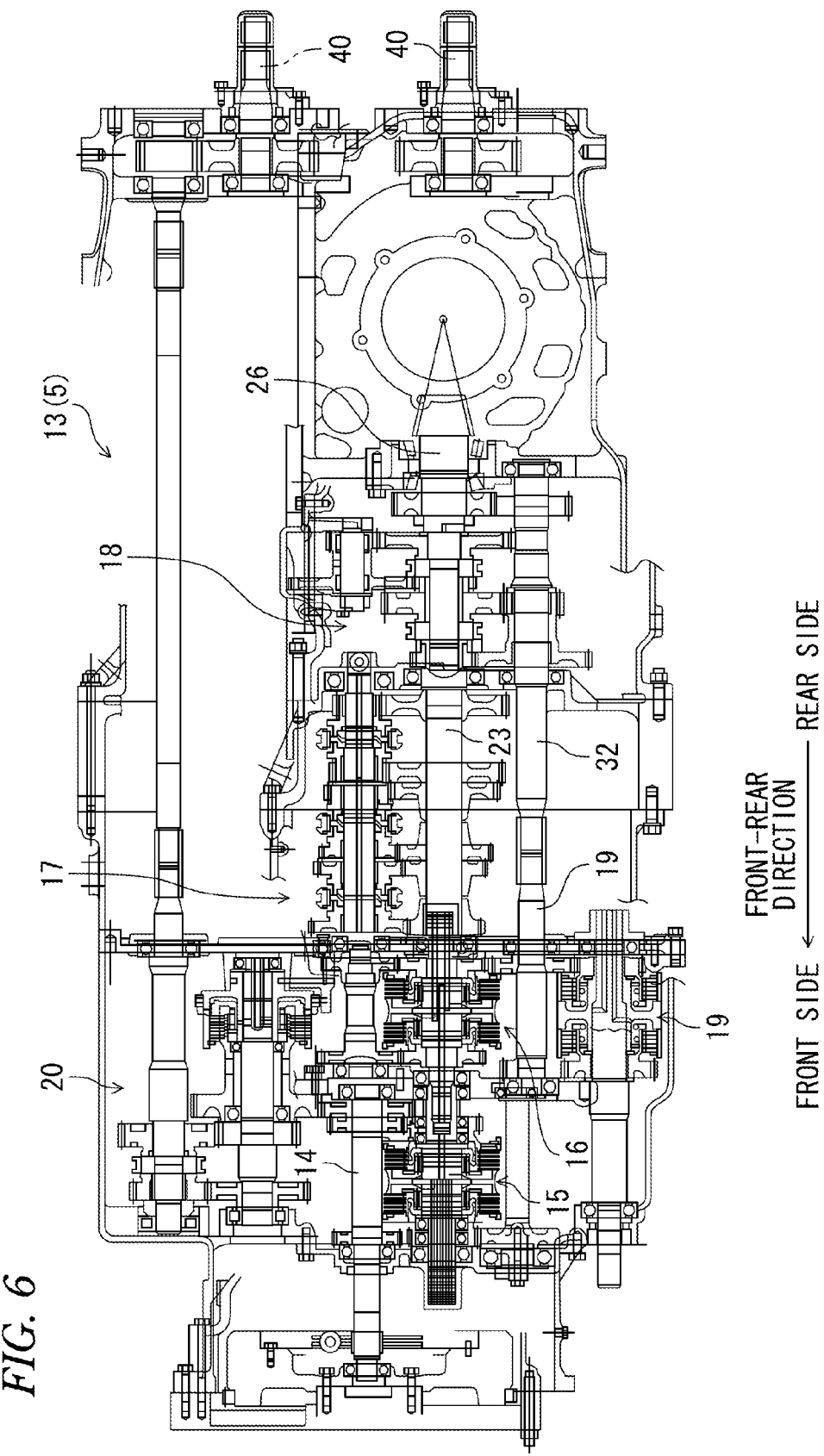
FIG. 6 is a partially developed pictorial view of a section showing the power transmission mechanism of the transmission of the tractor according to an illustrative embodiment.

FIGS. 5 and 6 are line diagrams showing a power transmission mechanism 13 in a transmission case 12 of the change speed device 5. The change speed device 5 includes the transmission case 12 (refer to FIG. 1) and the power transmission mechanism 13 that is arranged in the transmission case 12 and transmits the rotating power from the engine 4 to the rear wheels 3 and the like. The power transmission mechanism 13 transmits the rotating power from the engine 4 to the front wheels 2, the rear wheels 3 and the implement attached to the vehicle body and drives the same by the rotating power from the engine 4.

Specifically, the power transmission mechanism 13 includes an input shaft 14, an advancing and reversing switching mechanism 15 (first switching mechanism), a Hi-Lo change speed mechanism 16 serving as a high-low change speed mechanism, a main change speed mechanism 17, an auxiliary change speed mechanism 18, a 2WD/4WD switching mechanism 19 (second switching mechanism), a PTO (Power take-off) driving mechanism 20 and the like. The power transmission mechanism 13 can transmit the rotating power generated by the engine 4 to the rear wheels 3 through the input shaft 14, the advancing and reversing switching mechanism 15, the Hi-Lo change speed mechanism 16, the main change speed mechanism 17 and the auxiliary change speed mechanism 18 in corresponding order. Also, the power transmission mechanism 13 can transmit the rotating power generated by the engine 4 to the front wheels 2 through the input shaft 14, the advancing and reversing switching mechanism 15, the Hi-Lo change speed mechanism 16, the main change speed mechanism 17, the auxiliary change speed mechanism 18 and the 2WD/4WD switching mechanism 19 in corresponding order. Also, the power transmission mechanism 13 can transmit the rotating power generated by the engine 4 to the implement through the input shaft 14 and the PTO driving mechanism 20 in corresponding order.

The input shaft 14 is coupled with an output shaft of the engine 4 and is input with the rotating power from the engine 4.

The advancing and reversing switching mechanism 15 can switch the rotating power transmitted from the engine 4 to advancing direction rotation or reversing direction rotation. The advancing and reversing switching mechanism 15 includes an advancing-side gear stage 15a, a reversing-side gear stage 15b, a reverse counter gear 15c, an advancing hydraulic multiple disc clutch C1 and a reversing hydraulic multiple disc clutch C2 of a hydraulic multiple disc clutch type. The advancing/reversing hydraulic multiple disc clutches C1, C2 can switch a power transmission path in the advancing and reversing switching mechanism 15 by switching an engaged/release state thereof. The advancing and reversing switching mechanism 15 changes the transmission path of the rotating power transmitted to the input shaft 14 and then transmits the rotating power to a counter shaft 21 in accordance with the engaged/release states of the advancing/reversing hydraulic multiple disc clutches C1, C2.

When the advancing hydraulic multiple disc clutch C1 is at the engaged state and the reversing hydraulic multiple disc clutch C2 is at the release state, the advancing and reversing switching mechanism 15 transmits the rotating power transmitted to the input shaft 14 to the counter shaft 21 in the advancing direction rotation through the advancing-side gear stage 15a and the advancing hydraulic multiple disc clutch C1. When the advancing hydraulic multiple disc clutch C1 is at the release state and the reversing hydraulic multiple disc clutch C2 is at the engaged state, the advancing and reversing switching mechanism 15 transmits the rotating power transmitted to the input shaft 14 to the counter shaft 21 in the reversing direction rotation through the reversing-side gear stage 15b, the reverse gear 15c and the reversing hydraulic multiple disc clutch C2. Thereby, the advancing and reversing switching mechanism 15 can switch the advancing and reversing of the tractor 1. Also, the advancing and reversing switching mechanism 15 also functions as a main clutch and becomes a neutral state and interrupts the power transmission to the front wheels 2 and the rear wheels 3 by enabling all the advancing and reversing hydraulic multiple disc clutches C1, C2 to be at the release state. For example, when an operator operates an advancing and reversing switching lever 43 (refer to FIG. 8), the advancing and reversing switching mechanism 15 can switch the advancing, the reversing and the neutral by hydraulic control. Also, when the operator depresses a clutch pedal, the advancing and reversing switching mechanism 15 can release all the advancing and reversing hydraulic multiple disc clutches C1, C2.

The Hi-Lo change speed mechanism 16 can speed-change the rotating power transmitted from the engine 4 to a high-speed stage or low-speed stage. The Hi-Lo change speed mechanism 16 includes a Hi (high speed)-side gear stage 16a, a Lo (low speed)-side gear stage 16b, a hydraulic multiple disc clutch (Hi (high speed)-side clutch) C3 and a hydraulic multiple disc clutch (Lo (low speed)-side clutch) C4. The hydraulic multiple disc clutches C3, C4 can switch the power transmission path in the Hi-Lo change speed mechanism 16 by switching an engaged/release state. The Hi-Lo change speed mechanism 16 changes the transmission path of the rotating power transmitted to the counter shaft 21 and then transmits the rotating power to a gearshift shaft 22 in accordance with the engaged/release states of the hydraulic multiple disc clutches C3, C4. When the hydraulic multiple disc clutch C3 is at the engaged state and the hydraulic multiple disc clutch C4 is at the release state, the Hi-Lo change speed mechanism 16 speed-changes the rotating power, which is transmitted to the counter shaft 21, through the hydraulic multiple disc clutch C3 and the Hi-side gear stage 16a and transmits the same to the gearshift shaft 22.

When the hydraulic multiple disc clutch C3 is at the release state and the hydraulic multiple disc clutch C4 is at the engaged state, the Hi-Lo change speed mechanism 16 speed-changes the rotating power, which is transmitted to the counter shaft 21, through the hydraulic multiple disc clutch C4 and the Lo-side gear stage 16b and transmits the same to the gearshift shaft 22. Thereby, the Hi-Lo change speed mechanism 16 can speed-change the rotating power from the engine 4 with a change gear ratio of the Hi-side gear stage 16a or Lo (low speed)-side gear stage 16b and transmit the same to a rear stage. When an operator turns on/off a Hi-Lo switching switch (high-low gearshift operation switch) 44 (refer to FIG. 8), for example, the Hi-Lo change speed mechanism 16 can switch a Hi (high speed)-side and a Lo (low speed)-side by the hydraulic control and can change speed to any one of two high-speed and low-speed stages. Also, the Hi-Lo change speed mechanism 16 can change speed by the above configuration during the traveling of the tractor 1.

The main change speed mechanism 17 can speed-change the rotating power transmitted from the engine 4 to any one of a plurality of gearshift stages. The main change speed mechanism 17 is a synchromesh change speed mechanism and can speed-change the rotating power that is transmitted from the engine 4 through the advancing and reversing switching mechanism 15 and the Hi-Lo change speed mechanism 16. The main change speed mechanism 17 includes a plurality of gearshift stages of a first-speed gear stage 17a, a second-speed gear stage 17b, a third-speed gear stage 17c, a fourth-speed gear stage 17d, a fifth-speed gear stage 17e and a sixth-speed gear stage 17f. The main change speed mechanism 17 speed-changes the rotating power, which is transmitted to the gearshift shaft 22, through any one of the first-speed gear stage 17a to the sixth-speed gear stage 17f and transmits the same to a gearshift shaft 23 in accordance with coupling states of the first-speed gear stage 17a to the sixth-speed gear stage 17f with the gearshift shaft 22. Thereby, the main change speed mechanism 17 can speed-change the rotating power from the engine 4 with a change gear ratio of any one of the first-speed gear stage 17a to the sixth-speed gear stage 17f and transmit the same to the rear stage. For example, when an operator operates a main shift operation lever 45 (refer to FIG. 8), the main change speed mechanism 17 can select and switch one of the plurality of gearshift stages and change speed to any one of the first-speed gear stage 17a to the sixth-speed gear stage 17f. Also, the main change speed mechanism 17 can change speed by the above configuration during the traveling of the tractor 1.

The auxiliary change speed mechanism 18 can change-speed the rotating power that is transmitted from the engine 4 through the advancing and reversing switching mechanism 15, the Hi-Lo change speed mechanism 16 and the main change speed mechanism 17 in corresponding order. The auxiliary change speed mechanism 18 includes a first auxiliary change speed mechanism 24, a second auxiliary change speed mechanism 25 and the like and speed-changes the rotating power, which is transmitted to the gearshift shaft 23, through the first auxiliary change speed mechanism 24, the second auxiliary change speed mechanism 25 and the like and transmits the same to a gearshift shaft 26. The first auxiliary change speed mechanism 24 can speed-change the rotating power, which is transmitted from the engine 4 and is speed-changed in the main change speed mechanism 17 and the like, to the high speed stage or low speed stage and transmit the same to the rear wheels 3 that are the driving wheels. The second auxiliary change speed mechanism 25 can speed-change the rotating power, which is transmitted from the engine 4 and is speed-changed in the main change speed mechanism 17 and the like, to an extreme low speed stage that is further lower than the first auxiliary change speed mechanism 24 and transmit the same to the rear wheels 3 that are the driving wheels.

The first auxiliary change speed mechanism 24 of the auxiliary change speed mechanism 18 includes a first gear 24*a*, a second gear 24*b*, a third gear 24*c*, a fourth gear 24*d* and a shifter 24*e*. The first gear 24*a* is integrally rotatably coupled with the gearshift shaft 23 and is transmitted (input) with the rotating power from the gearshift shaft 23. The second gear 24*b* is meshed with the first gear 24*a*. The third gear 24*c* is integrally rotatably coupled with the second gear 24*b*. The fourth gear 24*d* is meshed with the third gear 24*c*. The shifter 24*e* is to switch the coupling states of the first gear 24*a* and the fourth gear 24*d* with the gearshift shaft 26. That is, a clutch claw 26*a* that is integrated with the gearshift shaft 26, a clutch claw 24*ac* that is integrated with the first gear 24*a* and a clutch claw 24*dc* that is integrated with the fourth gear 24*d* are formed to have the same diameter and the same number of teeth and are arranged to be adjacent each other. The shifter 24*e* is configured so that when the clutch claw 26*a* and the clutch claw 24*ac* are simultaneously engaged, the power is transmitted from the first gear 24*a* to the gearshift shaft 26, and when the clutch claw 26*a* and the clutch claw 24*dc* are simultaneously engaged, the power is transmitted from the fourth gear 24*d* to the gearshift shaft 26. In the meantime, the respective clutch claws are arranged so that the shifter 25*e* can be shifted to a position at which it is not engaged with any of the clutch claw 24*ac* and the clutch claw 24*dc*.

The shifter 24*e* can be moved to a Hi (high speed)-side position at which the first gear 24*a* and the gearshift shaft 26 are integrally rotatably coupled, a Lo (low speed)-side position at which the fourth gear 24*d* and the gearshift shaft 26 are integrally rotatably coupled and a neutral position at which both the first gear 24*a* and the fourth gear 24*d* are released without being coupled with the gearshift shaft 26. The first auxiliary change speed mechanism 24 switches the transmission path of the rotating power transmitted to the gearshift shaft 23 and transmits the rotating power to the gearshift shaft 26 in accordance with a position of the shifter 24*e*. When the shifter 24*e* is located at the Hi-side position, the first auxiliary change speed mechanism 24 transmits the rotating power transmitted to the gearshift shaft 23 from the first gear 24*a* to the gearshift shaft 26 without through the second gear 24*b*, the third gear 24*c* and the fourth gear 24*d* (the rotating power is transmitted in order of the gearshift shaft 23→the first gear 24*a*→the gearshift shaft 26). When the shifter 24*e* is located at the Lo-side position, the first auxiliary change speed mechanism 24 sequentially decelerates the rotating power, which is transmitted to the gearshift shaft 23, from the first gear 24*a* through the second gear 24*b*, the third gear 24*c*, the fourth gear 24*d* and the shifter 24*e* and transmits the same to the gearshift shaft 26. Thereby, the first auxiliary change speed mechanism 24 can speed-change the rotating power from the engine 4 with a change gear ratio of the Hi (high speed)-side without through the second gear 24*b*, the third gear 24*c* and the fourth gear 24*d* or with a change gear ratio of the Lo (low speed)-side through the second gear 24*b*, the third gear 24*c* and the fourth gear 24*d* and transmit the same to the rear stage. Also, when the shifter 24*e* is located at the neutral position, the first auxiliary change speed mechanism 24 is at a neutral state where both the first gear 24*a* and the fourth gear 24*d* run idle relative to the gearshift shaft 26. For example, when an operator operates a first auxiliary shift operation lever 49 (refer to FIG. 8), the position of the shifter 24*e* is switched, so that the first auxiliary change speed mechanism 24 can switch the Hi (high speed)-side Lo (low speed)-side and neutral positions.

The second auxiliary change speed mechanism 25 of the auxiliary change speed mechanism 18 includes a first gear 25*a*, a second gear 25*b*, a third gear 25*c*, a fourth gear 25*d* and a shifter 25*e*. The first gear 25*a* is integrally rotatably coupled with the fourth gear 25*d* at the first auxiliary change speed mechanism 24. The second gear 25*b* is meshed with the first gear 25*a*. The third gear 25*c* is integrally rotatably coupled with the second gear 25*b*. The fourth gear 25*d* is meshed with the third gear 25*c*. The shifter 25*e* is to switch the coupling state of the fourth gear 24*d* with the gearshift shaft 26. That is, a clutch claw 26*b* that is integrated with the gearshift shaft 26 and a clutch claw 25*dc* that is integrated with the fourth gear 25*d* are formed to have the same diameter and the same number of teeth and are arranged to be adjacent each other. The shifter 25*e* is configured so that when the clutch claw 26*b* and the clutch claw 25*dc* are simultaneously engaged, the power is transmitted from the fourth gear 25*d* to the gearshift shaft 26.

The shifter 25*e* can be moved to an extreme Lo (extreme low speed)-side position at which the fourth gear 25*d* and the gearshift shaft 26 are integrally rotatably coupled and a neutral position at which the fourth gear 24*d* is released without being coupled with the gearshift shaft 26. In this case, the rotation of the gearshift shaft 26 is controlled by a position of the shifter 24*e* of the first auxiliary change speed mechanism 24. The second auxiliary change speed mechanism 25 switches the transmission path of the rotating power transmitted to the gearshift shaft 23 and transmits the rotating power to the gearshift shaft 26 in accordance with a position of the shifter 25*e*. When the shifter 25*e* is located at the extreme Lo-side position under state where the first auxiliary change speed mechanism 24 is at the neutral state, the second auxiliary change speed mechanism 25 sequentially decelerates the rotating power, which is transmitted to the gearshift shaft 23, from the first gear 24*a* of the first auxiliary change speed mechanism 24 through the second gear 24*b*, the third gear 24*c*, the fourth gear 24*d* and the first gear 25*a*, the second gear 25*b*, the third gear 25*c*, the fourth gear 25*d* and the shifter 25*e* of the second auxiliary change speed mechanism 25 and transmits the same to the gearshift shaft 26. Thereby, the second auxiliary change speed mechanism 25 can speed-change the rotating power from the engine 4 with a change gear ratio of the extreme Lo (low speed)-side through the second gear 24*b*, the third gear 24*c*, the fourth gear 24*d*, the first gear 25*a*, the second gear 25*b*, the third gear 25*c* and the fourth gear 25*d* and transmit the same to the rear stage. Also, when the shifter 25*e* is located at the neutral position, the second auxiliary change speed mechanism 25 is at a neutral state where the fourth gear 24*d* runs idle relative to the gearshift shaft 26. For example, when an operator operates a second auxiliary shift operation lever 50 (refer to FIGS. 7A and 7B), the position of the shifter 25*e* is switched, so that the second auxiliary change speed mechanism 25 can switch the extreme Lo (extreme low speed)-side and neutral positions.

Therefore, the auxiliary change speed mechanism 18 can speed-change the rotating power transmitted to the gearshift shaft 23 to any one of the high speed, low speed and extreme low speed stages and transmit the same to the gearshift shaft 26 by combining the first auxiliary change speed mechanism 24 and the second auxiliary change speed mechanism 25. That is, when the first auxiliary change speed mechanism 24 is at the Hi (high speed)-side and the second auxiliary change speed mechanism 25 is at the neutral state, the auxiliary change speed mechanism 18 can change speed to the Hi (high speed) stage. When the first auxiliary change speed mechanism 24 is at the Lo (low speed)-side and the second auxiliary change speed mechanism 25 is at the neutral state, the auxiliary change speed mechanism 18 can change speed to the Lo (high speed) stage. When the first auxiliary change speed mechanism 24 is at the neutral state and the second auxiliary change speed mechanism 25 is at the extreme Lo (extreme low speed)-side, the auxiliary change speed mechanism 18 can change speed to the extreme Lo (extreme low speed) stage. The auxiliary change speed mechanism 18 switches the high speed, low speed and extreme low speed stages at a state where the tractor 1 stops.

The power transmission mechanism 13 of the change speed device 5 transmits the rotating power, which is transmitted to the gearshift shaft 26, to the rear wheels 3 through a rear wheel differential gear 27, a rear axle 28, a planetary gear deceleration mechanism 29 for deceleration and the like. As a result, the rear wheels 3 of the tractor 1 are rotated as the driving wheels by the rotating power from the engine 4.

Summarizing the above descriptions, the rotation of the input shaft 14 is first switched to the forward rotation or reverse rotation by the advancing and reversing switching mechanism 15, is speed-changed to any one of the two high speed and low speed stages by the Hi-Lo change speed mechanism 16, is speed-changed to any one of the first speed gear stage 17a to the sixth speed gear stage 17f by the main change speed mechanism 17, is further speed-changed to any one of the three high speed, low speed and extreme low speed stages by the auxiliary change speed mechanism 18 and is then transmitted to the axle 28. That is, the rotation of the input shaft 14 is speed-changed to any one of 36 stages (=2×6×3) and is then transmitted to the axle 28 by the power transmission mechanism 13 of the change speed device 5.

The 2WD/4WD switching mechanism 19 includes the hydraulic multiple disc clutches C6, C7 and also serves as a front-wheel speed increasing mechanism. The 2WD/4WD switching mechanism 19 includes a transmission shaft 19a, a Hi (high speed)-side gear stage 19b, a Lo (low speed)-side gear stage 19c, the hydraulic multiple disc clutch (Lo (low speed)-side clutch) C6, the hydraulic multiple disc clutch (Hi (high speed)-side clutch) C7 and a transmission shaft 19d. The hydraulic multiple disc clutches C6, C7 can switch the power transmission path in the 2WD/4WD switching mechanism 19 by switching the engaged/release state. The 2WD/4WD switching mechanism 19 changes the transmission path of the rotating power transmitted to the transmission shaft 19a and transmits the rotating power to the transmission shaft 19d in accordance with the engaged/release states of the hydraulic multiple disc clutches C6, C7. When the hydraulic multiple disc clutch C6 is at the engaged state and the hydraulic multiple disc clutch C7 is at the release state, the 2WD/4WD switching mechanism 19 speed-changes the rotating power, which is transmitted to the transmission shaft 19a, through the Lo-side gear stage 19c and the hydraulic multiple disc clutch C6 and then transmits the same to the transmission shaft 19d. When the hydraulic multiple disc clutch C6 is at the release state and the hydraulic multiple disc clutch C7 is at the engaged state, the 2WD/4WD switching mechanism 19 speed-changes the rotating power, which is transmitted to the transmission shaft 19a, through the Hi-side gear stage 19b and the hydraulic multiple disc clutch C7 and then transmits the same to the transmission shaft 19d. Thereby, the 2WD/4WD switching mechanism 19 can speed-change the rotating power from the engine 4 with a change gear ratio of the Hi-side gear stage 19b or Lo-side gear stage 19c and then transmit the same to the rear stage. In this case, the 2WD/4WD switching mechanism 19 can speed-change the rotating power from the engine 4 with the change gear ratio of the Hi-side gear stage 19b, relatively increase and transmit the same to the rear stage, as required, upon turning of the tractor 1, for example, thereby increasing the rotating speed of the front wheels 2 and reducing a turning radius of the tractor 1. In this case, the turning state of the vehicle body is automatically detected on the basis of the turning operation of the steering wheel by detecting that a steering angle is a predetermined value or larger, so that the clutch valve for control is configured so that the Hi-side gear stage 19b enters. Also, when both the hydraulic multiple disc clutches C6, C7 become at the release state, the 2WD/4WD switching mechanism 19 interrupts the rotating power transmitted to the transmission shaft 19a from being power-transmitted to the transmission shaft 19d. As a result, the tractor 1 can travel with the two-wheel driving. In the meantime, the 2WD/4WD switching mechanism 19 may not be provided with the Hi-side gear stage 19b, the hydraulic multiple disc clutch C7 and the like and may not have the function of the front-wheel speed increasing mechanism.

The 2WD/4WD switching mechanism 19 is to switch whether to transmit the rotating power transmitted to the gearshift shaft 26 to the front wheels 2 or not. The 2WD/4WD switching mechanism 19 includes the transmission shaft 19a, the Hi-side gear stage 19b, the Lo-side gear stage 19c, the transmission shaft 19d and a shifter 19e. The transmission shaft 19a is transmitted (input) with the rotating power from the gearshift shaft 26 through a gear 30, a gear 31, a transmission shaft 32, a coupling 33 and the like. The Hi-side gear stage 19b is relatively rotatably mounted to the transmission shaft 19a inserted therein.

The power transmission mechanism 13 of the change speed device 5 transmits the rotating power transmitted to the transmission shaft 19d to the front wheels 2 through a front wheel differential gear 34, a front axle 35, a vertical shaft 36, a planetary gear deceleration mechanism 37 and the like. As a result, the front wheels 2 and the rear wheels 3 are rotated as the driving wheels by the rotating power from the engine so that the tractor 1 can travel with the four-wheels driving. When the hydraulic multiple disc clutches C6, C7 are at the release state, the 2WD/4WD switching mechanism 19 interrupts the rotating power transmitted to the transmission shaft 19a from being power-transmitted to the transmission shaft 19d. As a result, the tractor 1 can travel with the two-wheel driving. When an operator operates a 2WD/4WD switching lever 46 (refer to FIG. 8), for example, the 2WD/4WD switching mechanism 19 can switch the two-wheel driving and the four-wheel driving.

The PTO driving mechanism 20 speed-changes the rotating power, which is transmitted from the engine 4, and outputs the same from a PTO shaft 40 (refer to FIG. 3) of the vehicle body rear side part to the implement, thereby driving the implement by the power from the engine 4. The PTO driving mechanism 20 includes a PTO clutch mechanism 38, a PTO transmission mechanism 39, the PTO shaft 40 and the like.

The PTO clutch mechanism 38 is to switch the transmission and interruption of the power to the PTO shaft 40. The PTO clutch mechanism 38 includes a PTO input gear 38a, a hydraulic multiple disc clutch C5 and a transmission shaft 38b for PTO gearshift input. The PTO input gear 38a is meshed with a gear 41 that is integrally rotatably coupled with the input shaft 14. The hydraulic multiple disc clutch C5 switches the engaged/release state, thereby switching the power transmission state between the PTO input gear 38a and the transmission shaft 38b for PTO transmission input. When the hydraulic multiple disc clutch C5 is at the engaged state, the PTO clutch mechanism 38 is at a PTO driving state where the power is transmitted to the PTO shaft 40, and transmits the rotating power, which is transmitted from the input shaft 14 to the PTO input gear 38a through the gear 41, to the transmission shaft 38b for PTO gearshift input through the hydraulic multiple disc clutch C5. When the hydraulic multiple disc clutch C5 is at the release state, the PTO clutch mechanism 38 becomes at a PTO non-driving state (neutral state) where the power transmission to the PTO shaft 40 is interrupted, and interrupts the rotating power transmitted to the PTO input gear 38a from being transmitted to the transmission shaft 38b for PTO gearshift input. When an operator turns on/off a PTO switching switch 47 (refer to FIG. 8), the PTO clutch mechanism 38 can switch the PTO driving state and the PTO non-driving state by the hydraulic control.

In the meantime, the tractor 1 is provided with a gear pump 70 through a gear 70a meshed with the PTO input gear 38a, a gear 70b meshed with the gear 70a and the like. The gear pump 70 provides a hydraulic pressure to a hydraulic system such as the power transmission mechanism 13.

The PTO transmission mechanism 39 is to change speed when transmitting the power to the PTO shaft 40. The PTO transmission mechanism 39 includes a Hi (high speed)-side gear stage 39a, a Lo (low speed)-side gear stage 39b, a transmission shaft 39c and a shifter 39d. The PTO transmission mechanism 39 speed-changes the rotating power, which is transmitted to the transmission shaft 38b, through the Hi-side gear stage 39a or Lo-side gear stage 39b in accordance with a position of the shifter 39d and transmits the same to the transmission shaft 39c. The shifter 39d is to switch the coupling states of the Hi-side gear stage 39a and the Lo-side gear stage 39b with the transmission shaft 39c. The shifter 39d can be moved to a Hi (high speed)-side position at which the Hi-side gear stage 39a and the transmission shaft 39c are coupled, a Lo (low speed)-side position at which the Lo-side gear stage 39b and the transmission shaft 39c are coupled and a neutral position at which both the Hi-side gear stage 39a and the Lo-side gear stage 39b are released without being coupled with the transmission shaft 39c. When the shifter 39d is located at the Hi-side position, the PTO transmission mechanism 39 transmits the rotating power transmitted to the transmission shaft 38b to the transmission shaft 39c through the Hi-side gear stage 39a. When the shifter 39d is located at the Lo-side position, the PTO transmission mechanism 39 transmits the rotating power transmitted to the transmission shaft 38b to the transmission shaft 39c through the Lo-side gear stage 39b. Thereby, the PTO transmission mechanism 39 can speed-change the rotating power from the engine 4 with a change gear ratio of the Hi-side gear stage 39a or Lo-side gear stage 39b and transmit the same to the rear stage. Also, when the shifter 39d is at the neutral position, the PTO transmission mechanism 39 becomes at a neutral state where both the Hi-side gear stage 39a and the Lo-side gear stage 39b run idle relative to the transmission shaft 39c. For example, when an operator operates a PTO gearshift operation lever 48 (refer to FIG. 8), the position of the shifter 39d is switched, so that the PTO transmission mechanism 39 can switch the Hi (high speed)-side, Lo (low speed)-side and neutral positions and can change speed to any one of the two high speed and low speed stages.

The PTO shaft 40 is coupled with an implement-side input shaft (not shown) through a universal joint shaft (not shown) and transmits the rotating power from the engine 4 to the implement. Since the transmission shaft 39c is located at a position deviating from a vehicle body center, the PTO shaft 40 is arranged at a left-right center of the vehicle body so that it can transmit power through the first gear 41, the second gear 42 and the like.

Summarizing the above descriptions, the rotation of the input shaft 14 is transmitted to the PTO transmission mechanism 39 through the PTO clutch mechanism 38, is speed-changed to any one of the two high speed and low speed stages by the PTO transmission mechanism 39 and is transmitted to the PTO shaft 40, thereby rotating the PTO shaft 40. As a result, the tractor 1 can speed-change the rotating power, which is transmitted from the engine 4, and output the same from the PTO shaft 40 to the implement, thereby driving the implement.

Figure 8:
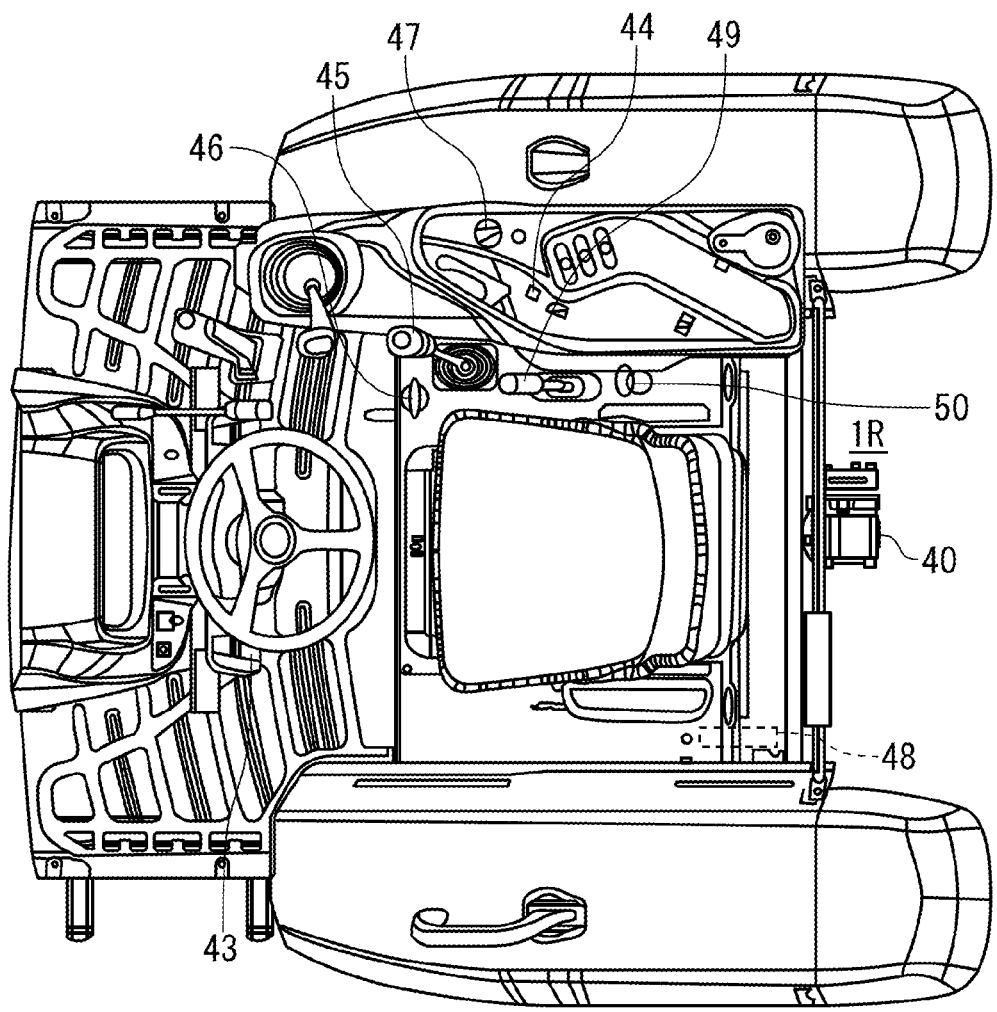
FIG. 8 is a schematic plan view including a cabin inside of the tractor according to an illustrative embodiment.

As shown in FIG. 8, the tractor 1 has a variety of operation levers that is arranged in the cabin 9 (refer to FIG. 1) or at the vehicle body rear side part 1R. The tractor 1 is provided in the cabin 9 with the advancing and reversing switching lever 43, the Hi-Lo switching switch 44, the main shift operation lever 45, the 2WD/4WD switching lever 46 and the PTO switching switch 47. Also, the tractor 1 is provided with the PTO gearshift operation lever 48 at the vehicle body rear side part 1R. The advancing and reversing switching lever 43 is to perform an advancing and reversing switching operation of the advancing and reversing switching mechanism 15 and can switch the advancing and reversing switching mechanism 15 to the advancing, reversing or neutral state when an operator operates the advancing and reversing switching lever 43. The Hi-Lo switching switch 44 is to perform a Hi-Lo gearshift operation (high-low gearshift operation) of the Hi-Lo change speed mechanism 16 and can switch the Hi-Lo change speed mechanism 16 to the high or low speed stage when an operator operates the Hi-Lo switching switch 44. The main shift operation lever 45 is to perform a main shift operation of the main change speed mechanism 17 and can switch the main change speed mechanism 17 to any one of the first speed gear stage 17a to the sixth speed gear stage 17f or neutral state when an operator operates the main shift operation lever 45. The 2WD/4WD switching lever 46 is to perform the 2WD/4WD switching operation of the 2WD/4WD switching mechanism 19 and can switch the 2WD/4WD switching mechanism 19 to the two-wheel driving or four-wheel driving when an operator operates the 2WD/4WD switching lever 46. The PTO switching switch 47 is to perform a clutch switching operation of the PTO clutch mechanism 38 and can switch the PTO clutch mechanism 38 to the PTO driving state or PTO non-driving state when an operator operates the PTO switching switch 47. The PTO gearshift operation lever 48 is to perform a PTO gearshift operation of the PTO transmission mechanism 39 and can switch the PTO transmission mechanism 39 to the high speed, low speed or neutral state when an operator operates the PTO gearshift operation lever 48.

In this illustrative embodiment, the tractor 1 is separately provided with the first auxiliary shift operation lever 49, which performs a first auxiliary shift operation of the first auxiliary change speed mechanism 24 of the auxiliary change speed mechanism 18, and the second auxiliary change speed operation lever 50, which performs a second auxiliary shift operation of the second auxiliary change speed mechanism 25 of the auxiliary change speed mechanism 18, thereby improving the general versatility. Both the first auxiliary shift operation lever 49 and the second auxiliary change speed operation lever 50 are provided in the cabin 9. In this illustrative embodiment, the tractor 1 is configured so that the second auxiliary change speed mechanism 25 is later mounted and added to the first auxiliary change speed mechanism 24 in the auxiliary change speed mechanism 18 and a gearshift stage (for example, extreme low speed stage) can be thus added, and is provided with the second auxiliary shift operation lever 50, which operates the gearshift stage provided by the addition of the second auxiliary change speed mechanism 25, separately from the first auxiliary shift operation lever 49.

Specifically, as shown in FIGS. 9, 10, 11 and 12, the first auxiliary shift operation lever 49 moves the shifter 24e to the Hi (high speed)-side position, Lo (low speed)-side position or neutral position in accordance with a first auxiliary shift operation of an operator. Also, the second auxiliary shift operation lever 50 moves the shifter 25e to the extreme Lo (extreme low speed)-side position or neutral position in accordance with a second auxiliary shift operation of an operator. Here, both the shifter 24e and the shifter 25e are provided for one common shifter stay 51 so that they can be relatively moved in an axis direction. The shifter stay 51 is provided along the front-rear direction. As described above, the shifter 24e integrally rotatably couples the first gear 24a and the gearshift shaft 26 at the Hi-side position, integrally rotatably couples the fourth gear 24d and the gearshift shaft 26 at the Lo-side position and releases the coupling state of the first gear 24a and fourth gear 24d with the gearshift shaft 26 at the neutral position. As described above, the shifter 25e integrally rotatably couples the fourth gear 25d and the gearshift shaft 26 at the extreme Lo-side position and releases the coupling state of the fourth gear 25d with the gearshift shaft 26 at the neutral position.

Figure 9:
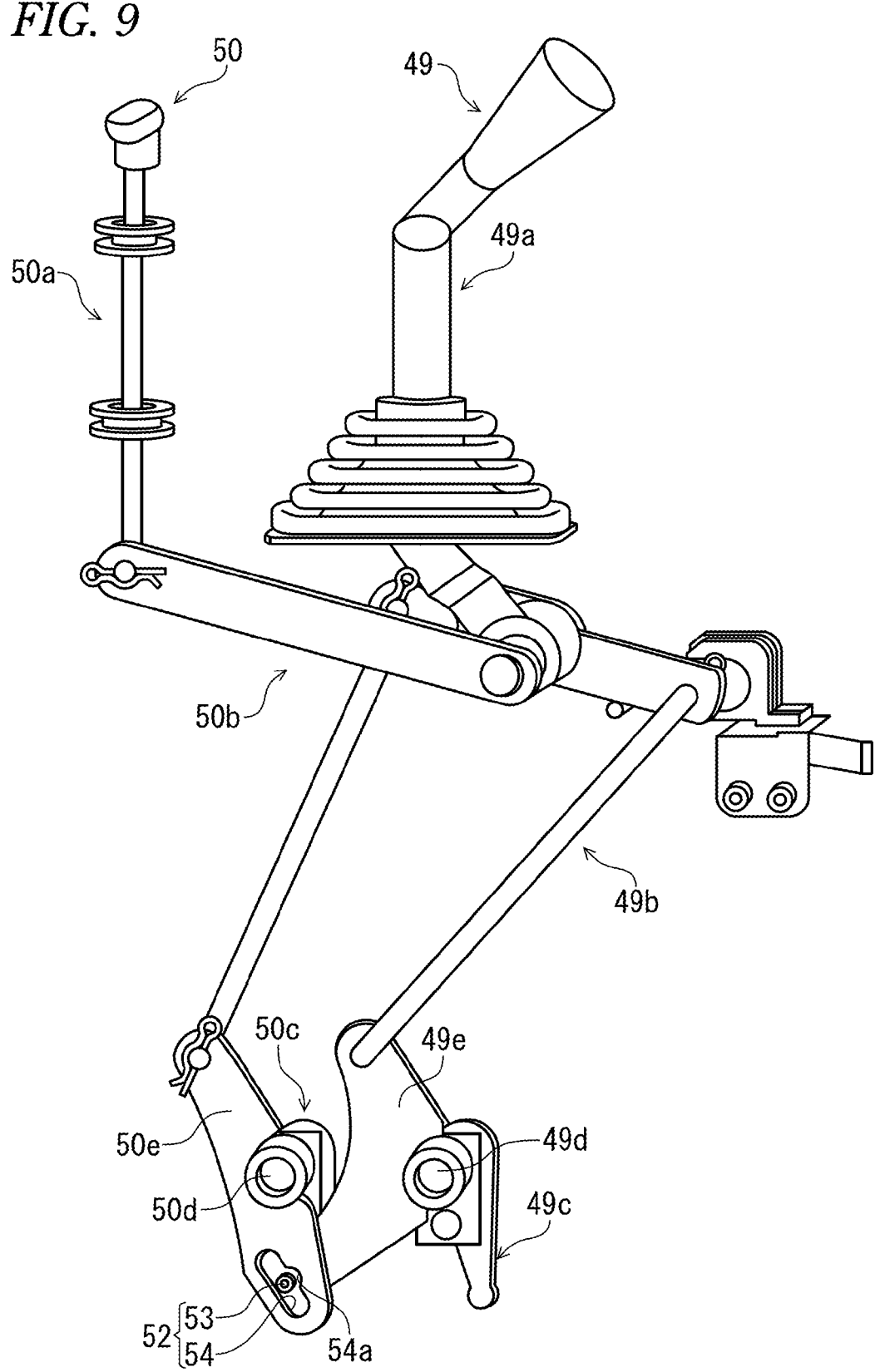
FIG. 9 is a pictorial perspective view including a first auxiliary shift operation lever and a second auxiliary shift operation lever of the tractor according to an illustrative embodiment.
Figure 10:
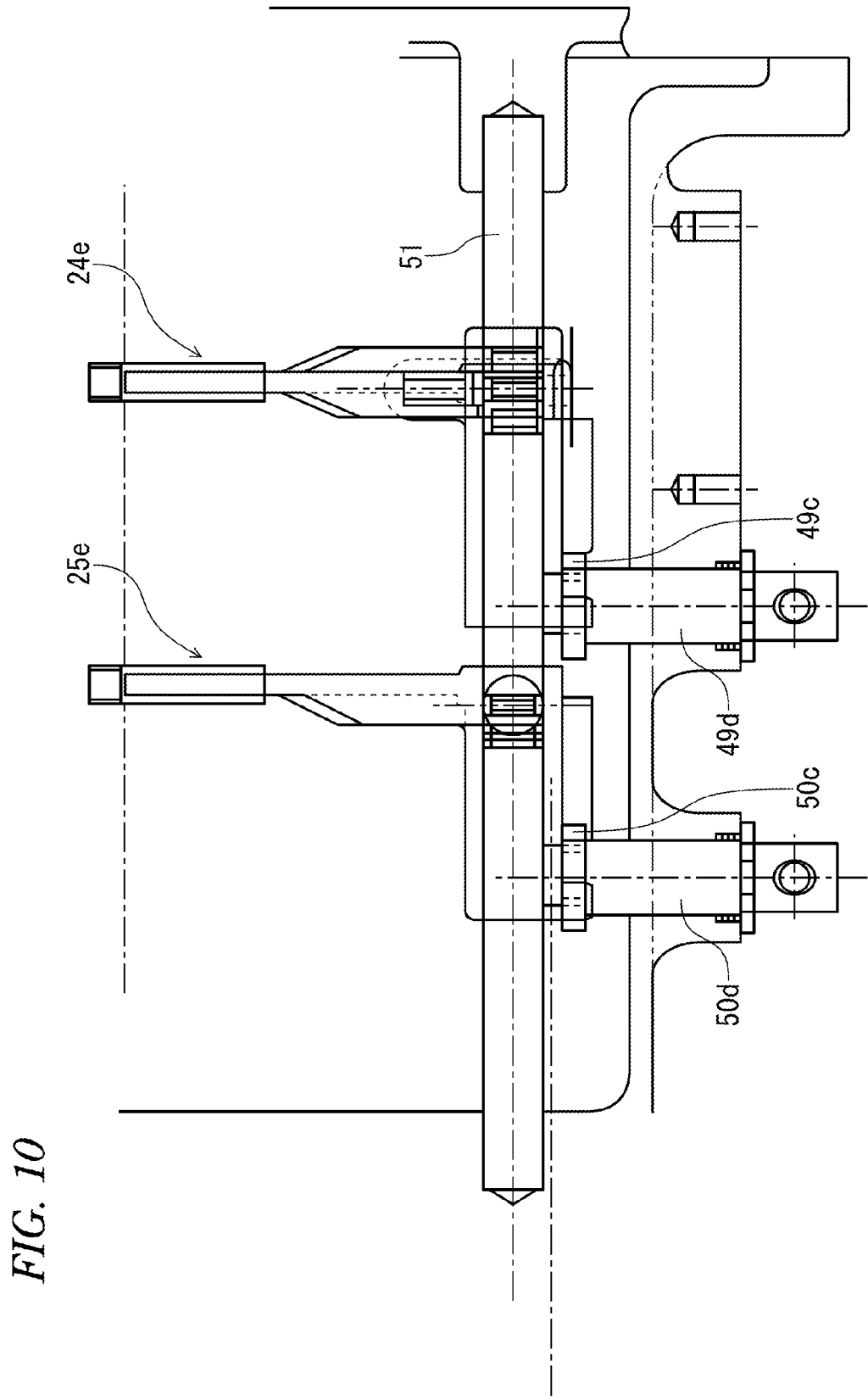
FIG. 10 is a sectional view in the vicinity of a shifter of an auxiliary change speed mechanism of the tractor according to an illustrative embodiment.
Figure 11:
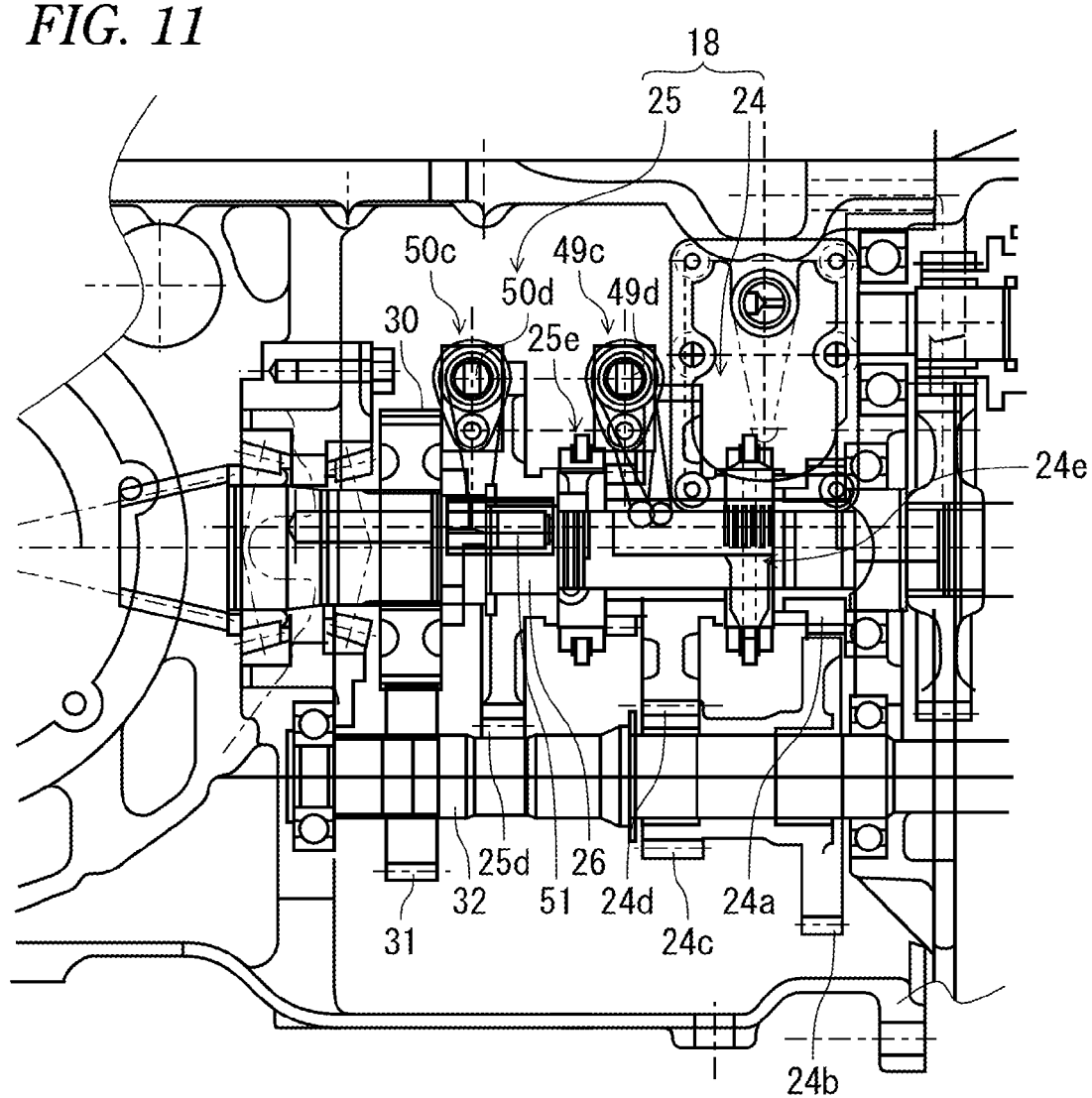
FIG. 11 is a sectional view of a direction along a shifter stay of the auxiliary change speed mechanism of the tractor according to an illustrative embodiment.
Figure 12:
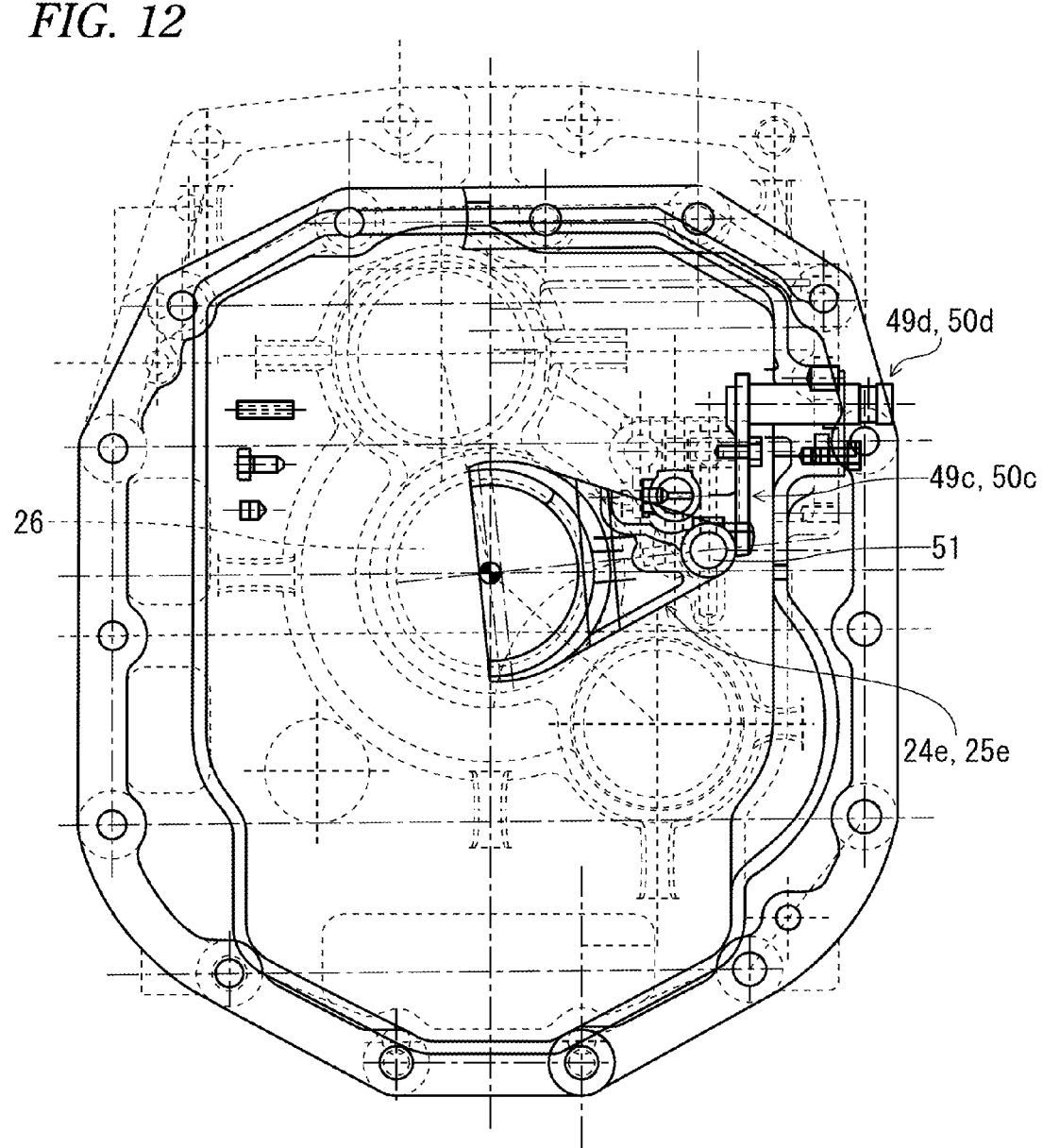
FIG. 12 is a sectional view of a direction intersecting with the shifter stay of the auxiliary change speed mechanism of the tractor according to an illustrative embodiment.

In this illustrative embodiment, as shown in FIG. 9, considering the above descriptions, the tractor 1 has a regulating mechanism 52 to thus prevent mechanical lock in the auxiliary change speed mechanism 18. The regulating mechanism 52 restrains the second auxiliary shift operation of the second auxiliary change speed operation lever 50 when the gearshift is made by the first auxiliary change speed mechanism 24 and restrains the first auxiliary shift operation of the first auxiliary change speed operation lever 49 when the gearshift is made by the second auxiliary change speed mechanism 25.

For example, in this illustrative embodiment, the regulating mechanism 52 includes a protrusion 53 and a long hole 54. The protrusion 53 is provided for any one of a link member 49e and a link member 50e, here the link member 49e. The long hole 54 is provided for the other of the link member 49e and the link member 50e, here the link member 50e. The protrusion 53 is provided at an end portion of the link member 49e, which is opposite to an end portion to which a rod part 49a is connected through another member configuring the link mechanism 49b, on the basis of a rotary shaft 49d. The long hole 54 is provided at an end portion, which is opposite to an end portion to which a rod part 50a is connected through another member configuring the link mechanism 50b, on the basis of a rotary shaft 50d.

The tractor 1 configured as described above is separately provided with the first auxiliary shift operation lever 49, which performs the first auxiliary shift operation of the first auxiliary change speed mechanism 24 configuring the auxiliary change speed mechanism 18, and the second auxiliary change speed operation lever 50, which performs the second auxiliary shift operation of the second auxiliary change speed mechanism 25 configuring the auxiliary change speed mechanism 18. Thereby, the tractor 1 can be configured so that a further gearshift stage can be easily added to the auxiliary change speed mechanism 18, and is provided with the second auxiliary shift operation lever 50 separately from the first auxiliary shift operation lever 49. Thus, it is possible to easily provide the tractor with a further gearshift stage (for example, extreme low speed stage) at low cost, thereby improving the general versatility. In this case, the tractor 1 has the regulating mechanism 52, so that it can restrain the second auxiliary shift operation, which is made by the second auxiliary change speed operation lever 50, from being performed at the state where the gearshift is made by the first auxiliary change speed mechanism 24 and the first auxiliary shift operation, which is made by the first auxiliary change speed operation lever 49, from being performed at the state where the gearshift is made by the second auxiliary change speed mechanism 25. As a result, the tractor 1 can prevent the mechanical lock in the auxiliary change speed mechanism 18.

Also, the tractor 1 is provided with the advancing and reversing switching mechanism 15, the Hi-Lo change speed mechanism 16 and the main change speed mechanism 17 at an upstream side of the auxiliary change speed mechanism 18 as regards the power transmission path, i.e., at the engine 4-side, and the auxiliary change speed mechanism 18 can speed-change the rotating power that is transmitted through the advancing and reversing switching mechanism 15, the Hi-Lo change speed mechanism 16 and the main change speed mechanism 17. As a result, the tractor 1 can configure the power transmission mechanism 13 of the change speed device 5 with a further multistage configuration, thereby improving the general versatility. More specifically, the tractor 1 has the advancing and reversing switching mechanism 15 and the Hi-Lo change speed mechanism 16 that are arranged at the engine 4-side as regards the power transmission path. Thereby, it is possible to arrange the hydraulic multiple disc clutches C1, C2, C3, C4 configuring the advancing and reversing switching mechanism 15 and Hi-Lo change speed mechanism 16 at a more upstream side of the power transmission path than the auxiliary change speed mechanism 18 or main change speed mechanism 17. As a result, the tractor 1 can arrange the hydraulic multiple disc clutches C1, C2, C3, C4 at positions of the power transmission path, at which the speed of the rotating power is relatively high and a magnitude of transmission torque is relatively small. Therefore, since the tractor 1 can configure torque capacities of the hydraulic multiple disc clutches C1, C2, C3, C4 to be relatively small, it is possible to miniaturize the apparatus and to reduce the manufacturing cost. Also from this point, the tractor 1 can improve the general versatility. Also, since the Hi-Lo change speed mechanism 16 and the main change speed mechanism 17 can change speed during the traveling, the tractor 1 can select one of many gearshift stages and change speed depending on circumstances during the traveling, which can also improve the general versatility.

Figure 13:
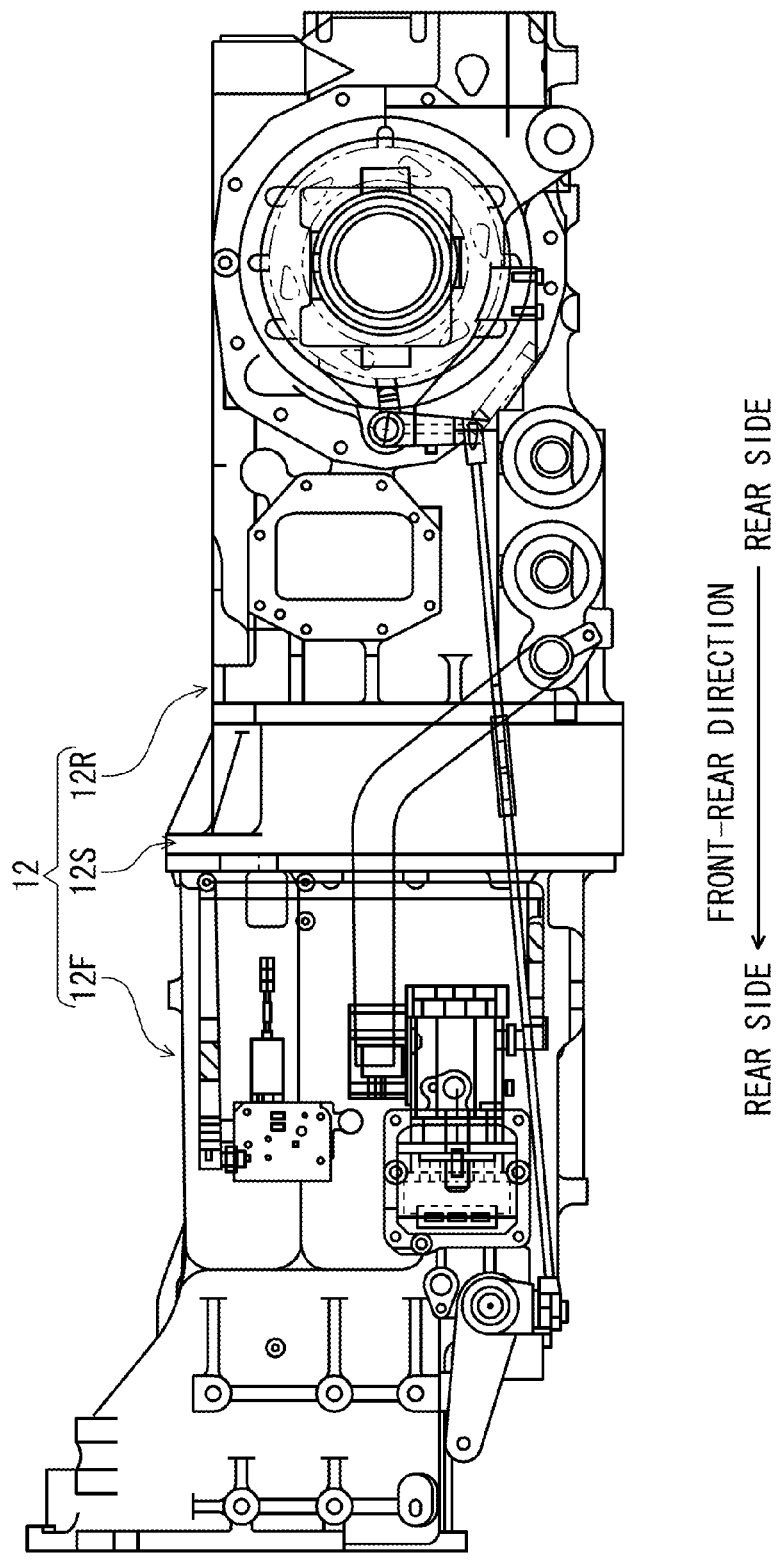
FIG. 13 is a partial side view of a transmission case of the tractor according to an illustrative embodiment, which is seen from a left side in a vehicle width direction.
Figure 14:
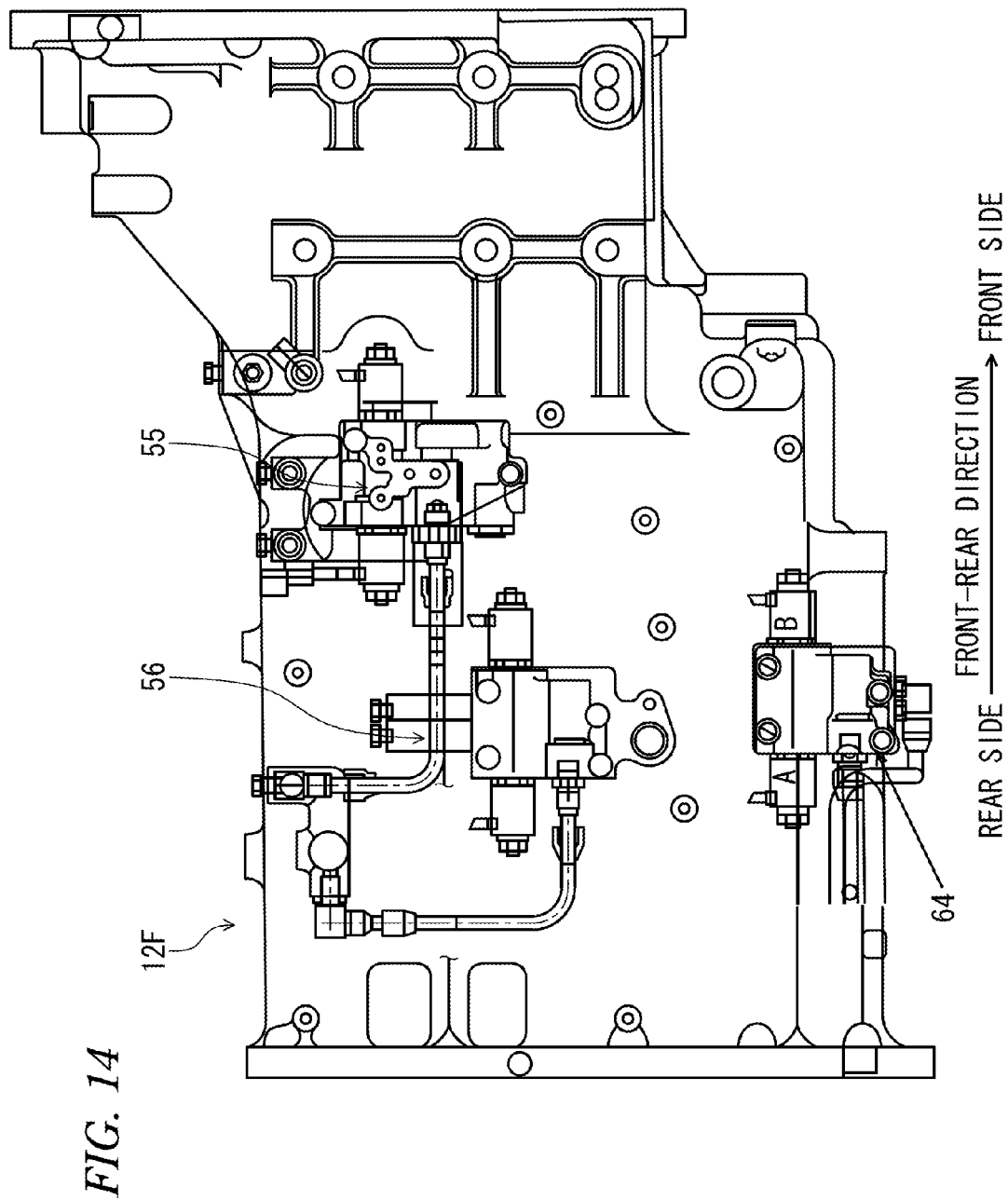
FIG. 14 is a partial side view of a front transmission case of the tractor according to an illustrative embodiment, which is seen from a right side in the vehicle width direction.
Figure 15:
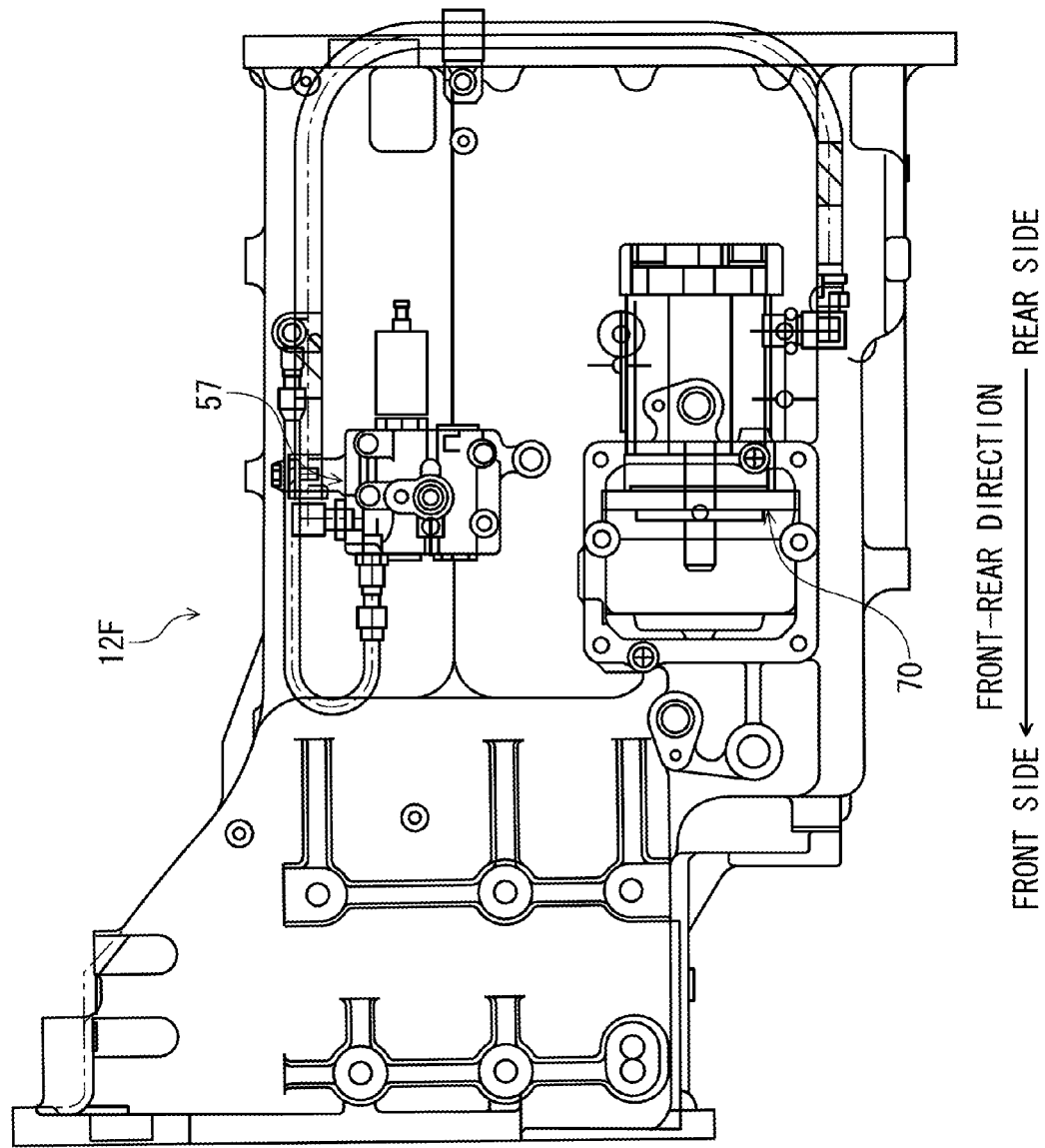
FIG. 15 is a partial side view of the front transmission case of the tractor according to an illustrative embodiment, which is seen from a left side in the vehicle width direction.
Figure 16C:
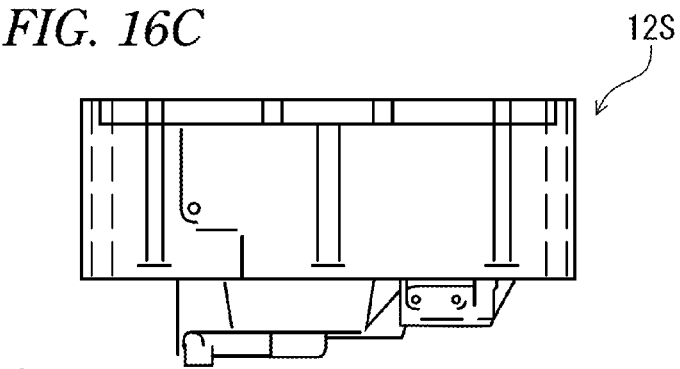
FIGS. 16A, 16B and 16C are a side view, a rear view and a plan view of a spacer case of the tractor according to an illustrative embodiment.
Figure 16A:
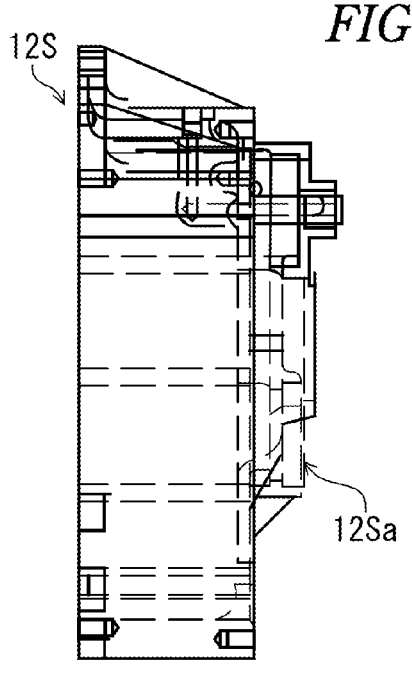
Figure 16B:
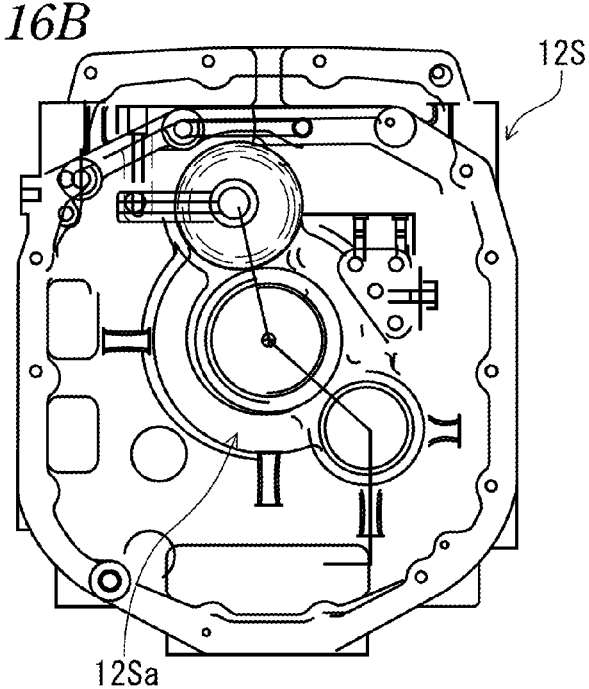

In the meantime, as shown in FIG. 13, the transmission case 12 of this illustrative embodiment is divided into a front transmission case 12F at the front side in the front-rear direction and a rear transmission case 12R at the rear side in the front-rear direction. In this illustrative embodiment, as shown in FIGS. 14 and 15, the front transmission case 12F is provided with a clutch valve 55 for control of the hydraulic multiple disc clutches C1, C2 of the advancing and reversing switching mechanism 15, a clutch valve 56 for control of the hydraulic multiple disc clutches C3, C4 of the Hi-Lo change speed mechanism 16, a clutch valve 57 for control of the hydraulic multiple disc clutch C5 of the PTO clutch mechanism 38, a clutch valve 64 for control of the hydraulic multi disc clutches C6, C7 of the 2WD/4WD switching mechanism 19, the gear pump 70 and like, which are divided and arranged on left and right surfaces thereof. Here, as shown in FIG. 14, the clutch valve 55, the clutch valve 56 and the clutch valve 64 are arranged on the right surface of the front transmission case 12F in the vehicle width direction. In the meantime, as shown in FIG. 15, the clutch valve 57 and the gear pump 70 are arranged on the left surface of the front transmission case 12F in the vehicle width direction. As a result, the tractor 1 can effectively arrange the clutch valves 55, 56, 57, 64, the gear pump 70 and the like on an outer surface of the front transmission case 12F.

Although the transmission case may be configured by the two cases of the front transmission case 12F and the rear transmission case 12R, a spacer case 12S having a spacer shape is sandwiched between the cases 12F, 12R (FIG. 13), in this illustrative embodiment. That is, the spacer case 12S is provided between the front transmission case 12F and the rear transmission case 12R of the transmission case 12, and a metal part 12Sa that supports the gearshift shaft 22 and gearshift shaft 23 of the main change speed mechanism 17 and the transmission shaft 32 to the 2WD/4WD switching mechanism 19 is formed. By this configuration, the gearshift shafts 22, 23 and the transmission shaft 32 are supported by the metal part 12Sa of the spacer case 12S between the front transmission case 12F and the rear transmission case 12R, so that it is possible to omit a metal configuration at the front-side of the rear transmission case 12R. The gearshift shafts 22, 23 and the transmission shaft 32, which are assembled so as to connect the front transmission case 12F and the spacer case 12S but extend rearwards in the front transmission case 12F, can be axis-supported to the metal part 12Sa while precisely adjusting and aligning the spacer case 12S that can be easily handled as regards the weight and size, and also can be adhered to a rear surface of the front transmission case 12F. As a result, it is possible to easily perform the adhesion operation of the spacer case 12S while mounting the internal gears and shafts.

Also, the spacer case 12S is formed at a flange part, which is slightly wider than a left-right width of the front transmission case 12F, and forms dead spaces at the left and right side surfaces of the front transmission case 12F. By using the dead spaces, it is possible to mount the control clutch valves 55, 56, 57, 64.

Figure 17:
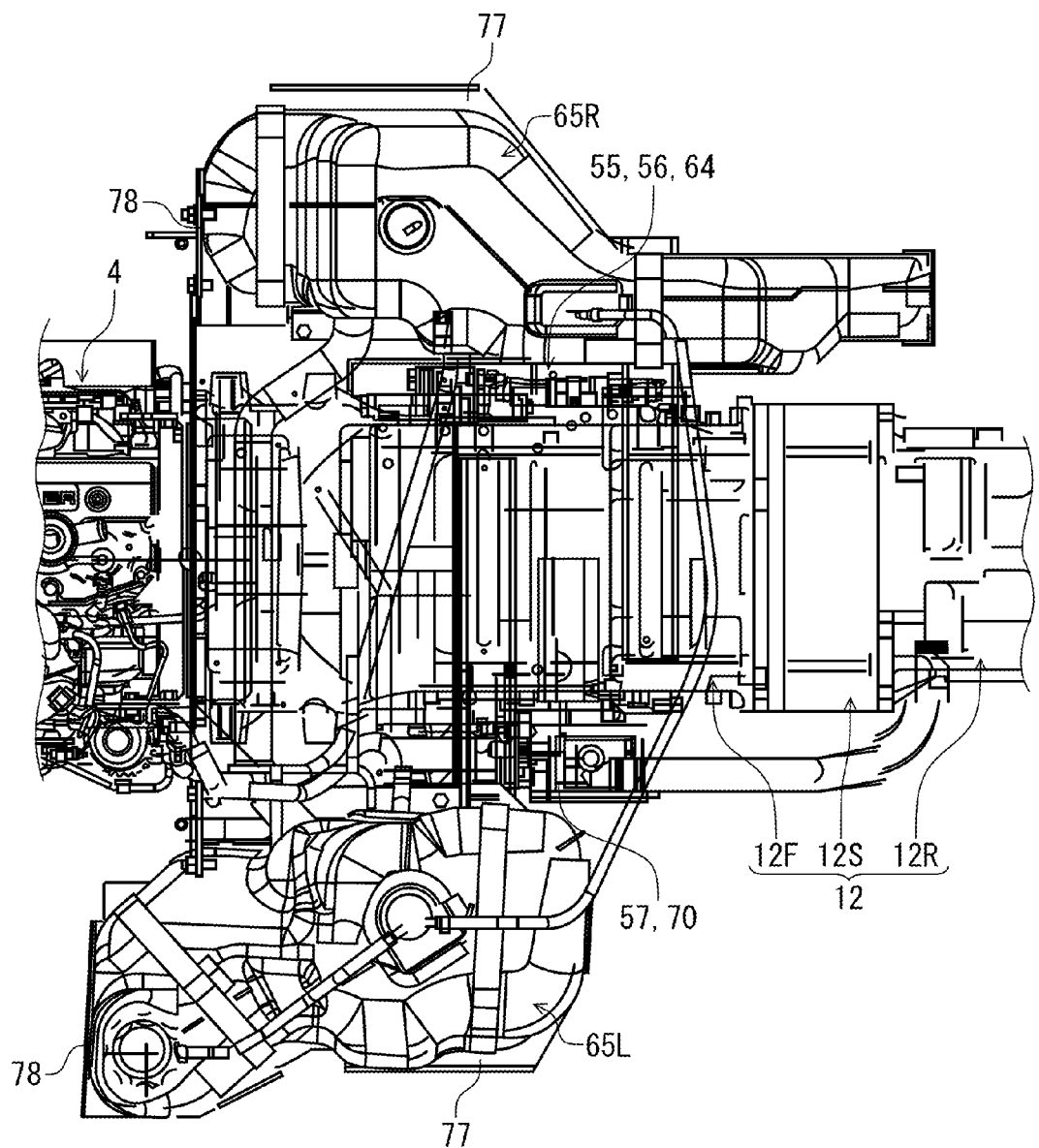
FIG. 17 is a plan view of the transmission case and fuel tanks of the tractor according to an illustrative embodiment.
Figure 18:
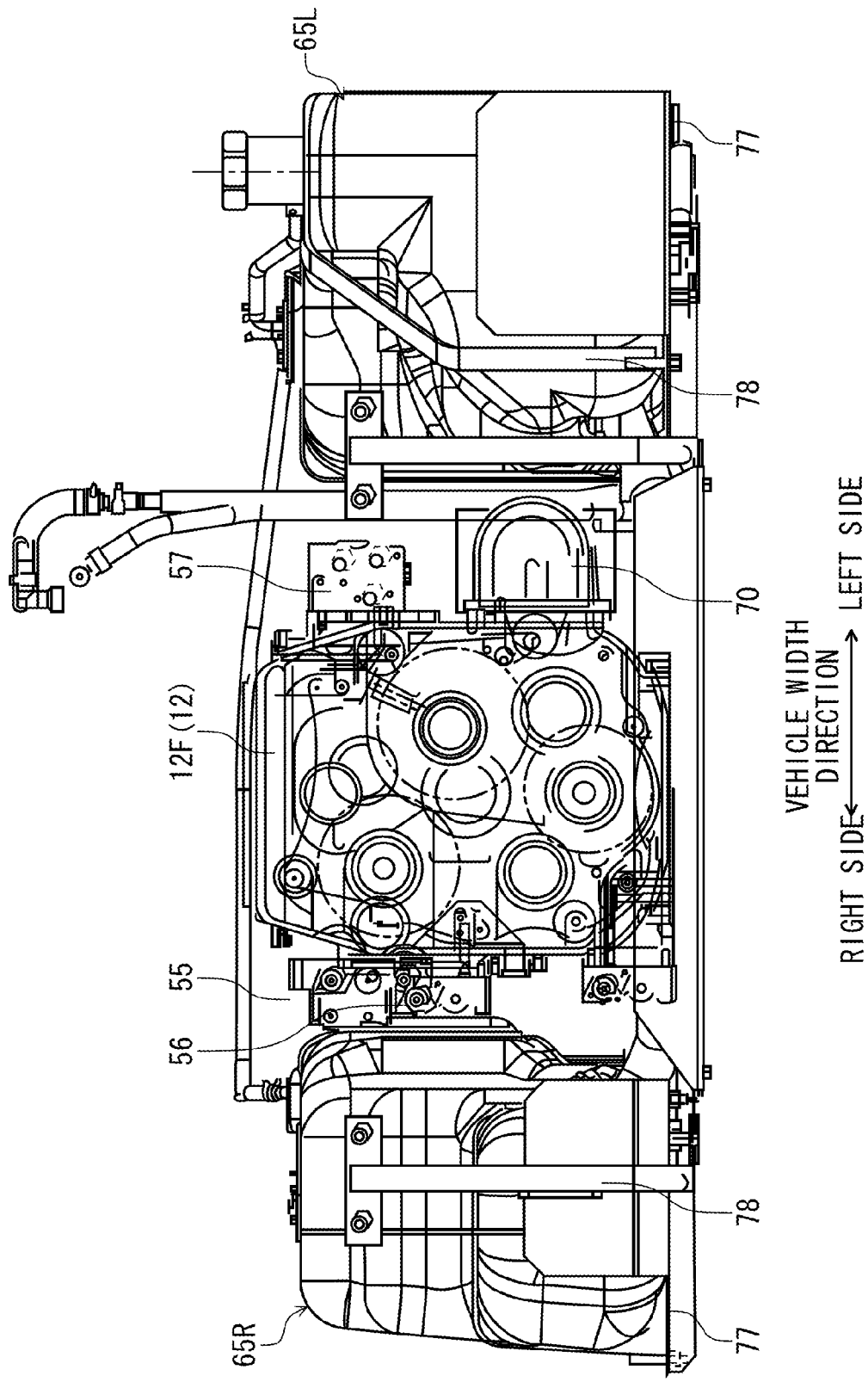
FIG. 18 is a front view of the transmission case and the fuel tanks of the tractor according to an illustrative embodiment.

The front transmission case 12F is provided at the left and right sides thereof with fuel tanks 65L, 65R. The left and right fuel tanks 65L, 65R are put on a reinforcement support member 77 that extends laterally from the lower of the transmission case 12, and are supported by a vertical support member 78, which is formed to protrude in the left-right direction from a bonded part of a rear end of the engine 4 and a front end of the transmission case 12, and the like. For this reason, the sides of the control clutch valves 55, 56, 57, 64 and the gear pump 70 are surrounded and are thus protected from the collision with the other objects (FIGS. 17 and 18).

Figure 19:
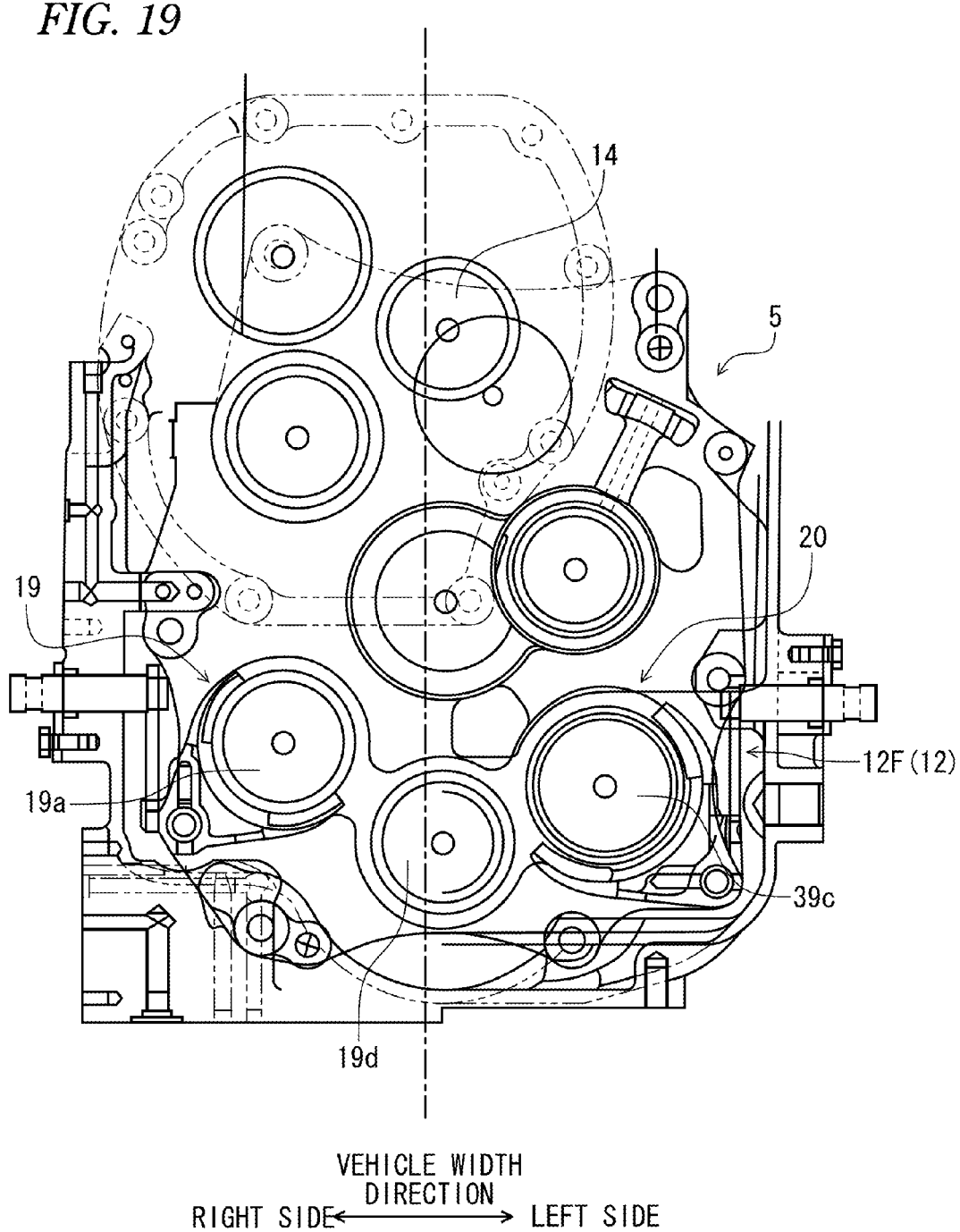
FIG. 19 is a sectional view taken along the vehicle width direction of the transmission of the tractor according to an illustrative embodiment.

Also, as shown in FIG. 19, the change speed device 5 of this illustrative embodiment is configured so that the 2WD/4WD switching mechanism 19 and the PTO driving mechanism 20 are arranged at opposing positions on the basis of a central line in the vehicle width direction in the front transmission case 12F. Here, the change speed device 5 is configured so that the 2WD/4WD switching mechanism 19 is arranged at the right side in the vehicle width direction and the PTO driving mechanism 20 is arranged at the left side in the vehicle width direction. As a result, the change speed device 5 can effectively arrange the 2WD/4WD switching mechanism 19 and the PTO driving mechanism 20 and suppress a height in the vertical direction. Hence, for example, the change speed device 5 can suppress a downward protruding in the vertical direction, thereby making a vehicle height relatively high.

Figure 20:
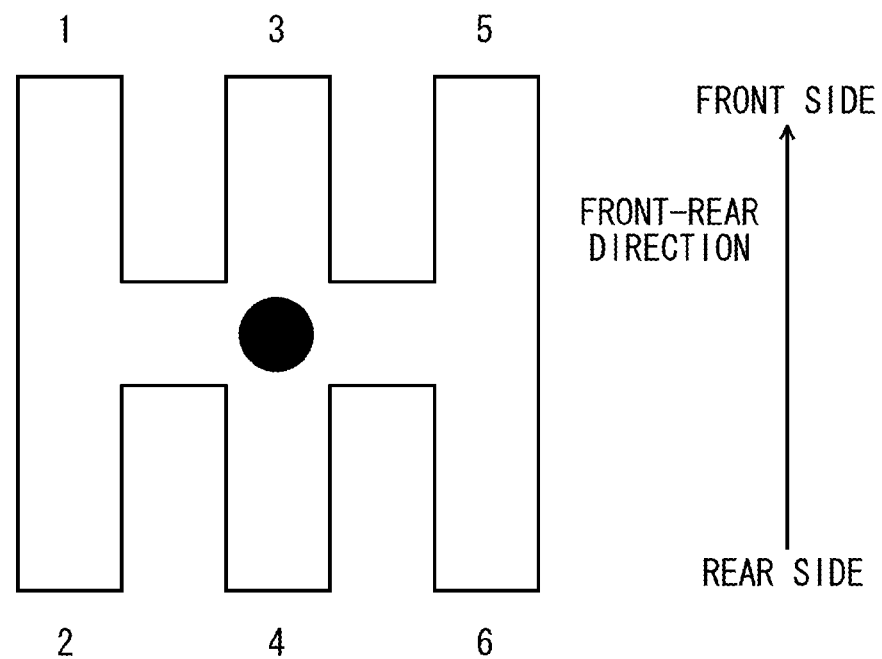
FIG. 20 is a pictorial view illustrating transmission positions of a main shift operation lever of the tractor according to an illustrative embodiment.

Also, in this illustrative embodiment, the main shift operation lever 45 switches the main change speed mechanism 17 to any one of the first speed gear stage 17a to the sixth speed gear stage 17f or to the neutral state depending on the main shift operation of an operator. As shown in FIG. 20, the main shift operation lever 45 is operated in the direction of the main shift operation, here in the vehicle width direction and in the front-rear direction, so that it can be operated to a first speed gearshift position corresponding to the first speed gear stage 17a, a second speed gearshift position corresponding to the second speed gear stage 17b, a third speed gearshift position corresponding to the third speed gear stage 17c, a fourth speed gearshift position corresponding to the fourth speed gear stage 17d, a fifth speed gearshift position corresponding to the fifth speed gear stage 17e and a sixth speed gearshift position corresponding to the sixth speed gear stage 17f on the basis of the neutral position.

Figure 21:
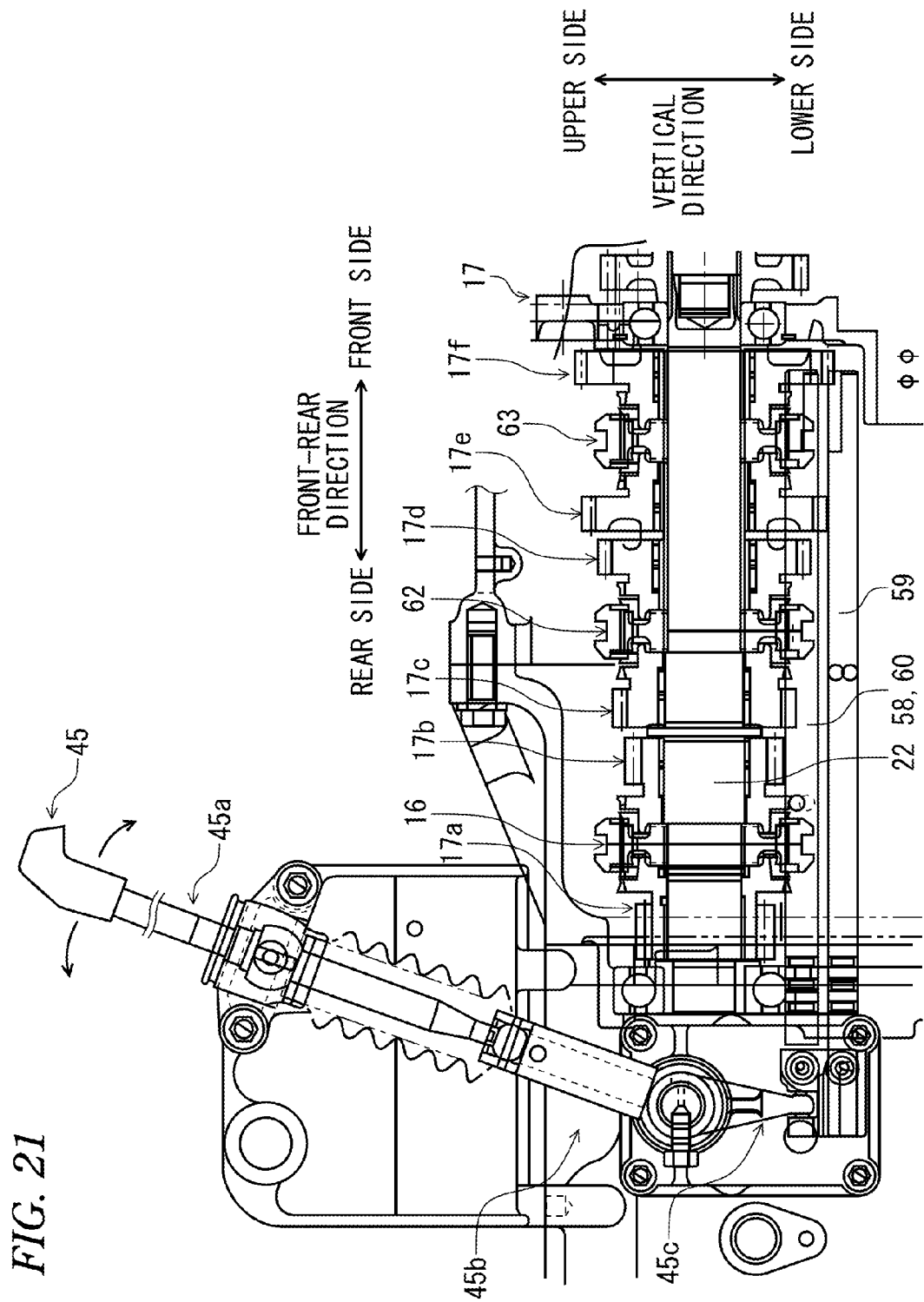
FIG. 21 is a sectional view of a direction along a shifter stay of the main change speed mechanism of the tractor according to an illustrative embodiment.
Figure 22:
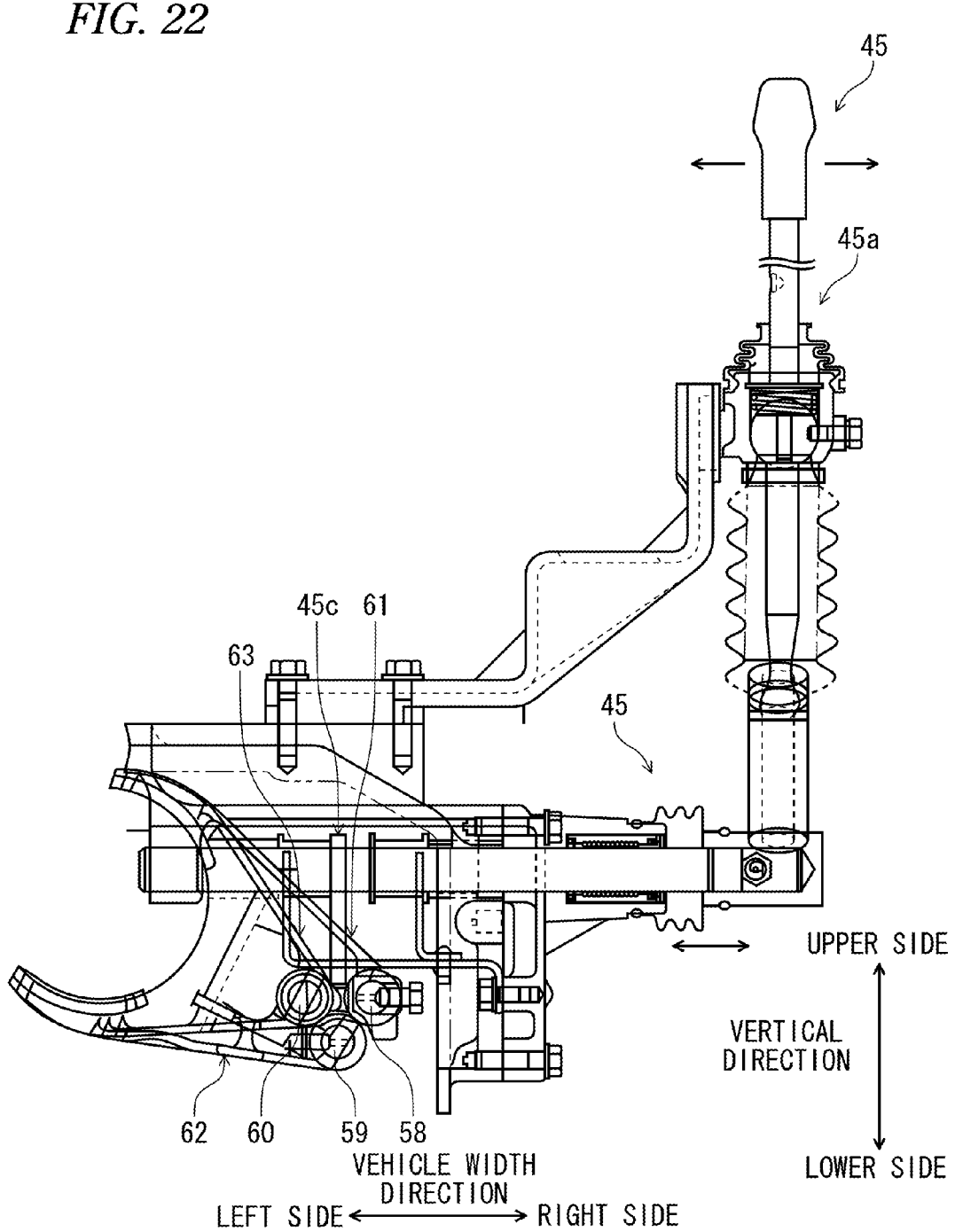
FIG. 22 is a sectional view of a direction intersecting with the shifter stay of the main change speed mechanism of the tractor according to an illustrative embodiment.
Figure 23:
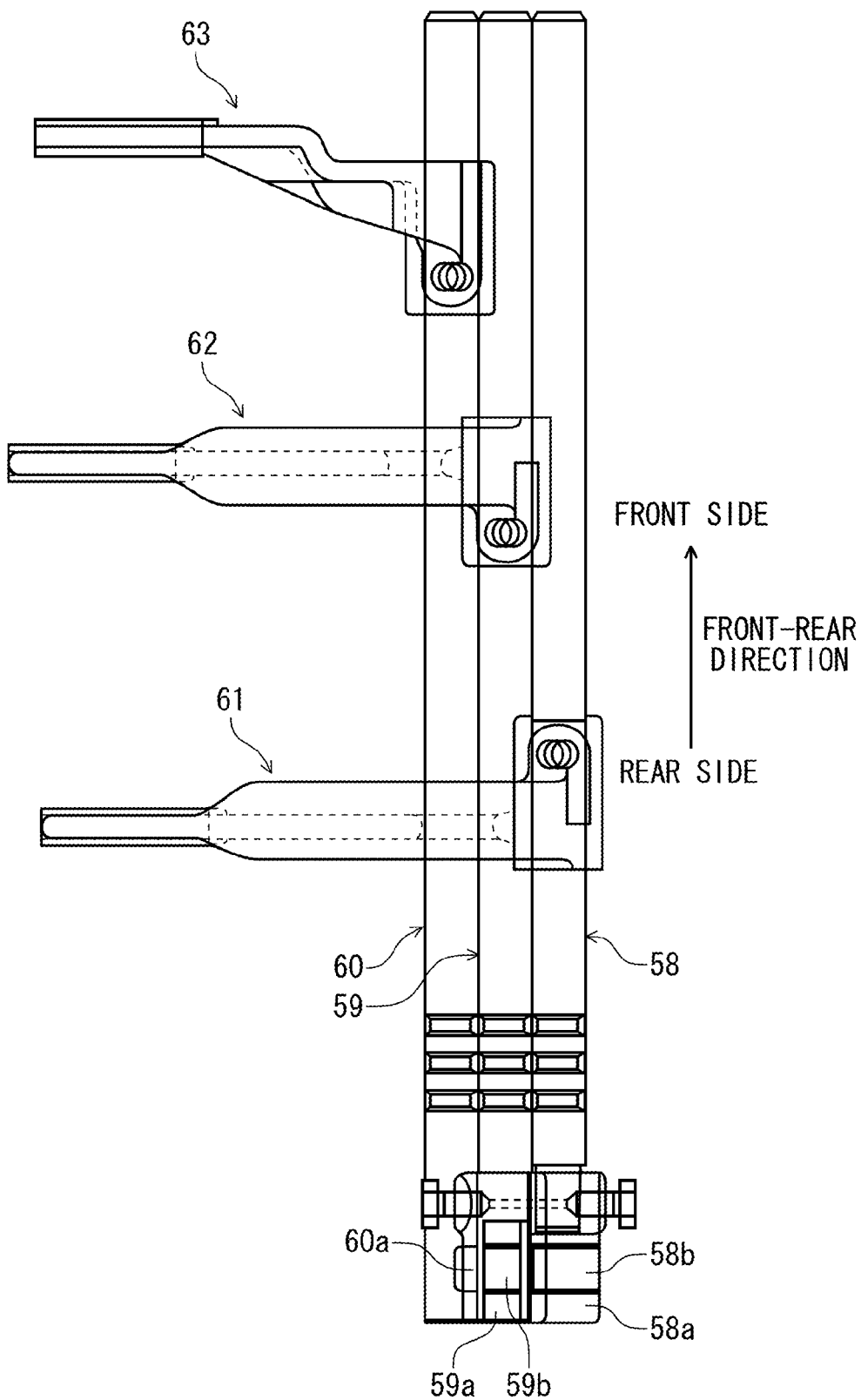
FIG. 23 is a schematic view of the shifter stay and a shifter of the main change speed mechanism of the tractor according to an illustrative embodiment.

As shown in FIGS. 21, 22 and 23, the main shift operation lever 45 moves any one of the three shifter stays 58, 59, 60 to thus move the shifters 61, 62, 63, which are respectively provided for the shifter stays 58, 59, 60, to predetermined positions corresponding to the first speed gear stage 17a to the sixth speed gear stage 17f in accordance with the main shift operation. Thereby, the main shift operation lever 45 realizes 6 (=2×3) positions by one lever, so that it can switch the main change speed mechanism 17 to any one of the first speed gear stage 17a to the sixth speed gear stage 17f or to the neutral state.

The respective shifter stays 58, 59, 60 are provided to move in the front-rear direction. When seen from a section taken along the vehicle width direction (refer to FIG. 22), the shifter stays 58, 59, 60 are arranged so that the shifter stays 58, 60 face each other at the left and right sides in the vehicle width direction, on the basis of the shifter stay 59. Here, the shifter stay 58 is positioned at the right-upper side in the vehicle width direction as regards the shifter stay 59 and the shifter stay 60 is positioned at the left-upper side in the vehicle width direction as regards the shifter stay 59. The shifter stay 58 and the shifter stay 60 are arranged so that they partially overlap with the shifter stay 59 in the vertical direction. Also, the shifter stay 58 is arranged so that it partially overlaps with the shifter stay 59 in the vehicle width direction. Likewise, the shifter stay 60 is arranged so that it partially overlaps with the shifter stay 59 in the vehicle width direction. Thereby, the main change speed mechanism 17 can be configured to be more compact, which also improves the general versatility of the tractor 1.

The shifter 61 is fixed to the shifter stay 58. The shifter 61 is to switch the coupling state of the first speed gear stage 17a and the second speed gear stage 17b with the gearshift shaft 22 and is arranged between the first speed gear stage 17a and the second speed gear stage 17b in the front-rear direction. As the shifter stay 58 is moved in the front-rear direction, the shifter 61 can be moved to a first speed-side position at which the first speed gear stage 17a and the gearshift shaft 22 are integrally rotatably coupled, a second speed-side position at which the second speed gear stage 17b and the gearshift shaft 22 are integrally rotatably coupled and a neutral position at which both the first speed gear stage 17a and the second speed gear stage 17b are released without being coupled with the gearshift shaft 22. The shifter 62 is fixed to the shifter stay 59. The shifter 62 is to switch the coupling state of the third speed gear stage 17c and the fourth speed gear stage 17d with the gearshift shaft 22 and is arranged between the third speed gear stage 17c and the fourth speed gear stage 17d in the front-rear direction. As the shifter stay 59 is moved in the front-rear direction, the shifter 62 can be moved to a third speed-side position at which the third speed gear stage 17c and the gearshift shaft 22 are integrally rotatably coupled, a fourth speed-side position at which the fourth speed gear stage 17d and the gearshift shaft 22 are integrally rotatably coupled and a neutral position at which both the third speed gear stage 17c and the fourth speed gear stage 17d are released without being coupled with the gearshift shaft 22. The shifter 63 is fixed to the shifter stay 60. The shifter 63 is to switch the coupling state of the fifth speed gear stage 17e and the sixth speed gear stage 17f with the gearshift shaft 22 and is arranged between the fifth speed gear stage 17e and the sixth speed gear stage 17f in the front-rear direction. As the shifter stay 60 is moved in the front-rear direction, the shifter 63 can be moved to a fifth speed-side position at which the fifth speed gear stage 17e and the gearshift shaft 22 are integrally rotatably coupled, a sixth speed-side position at which the sixth speed gear stage 17f and the gearshift shaft 22 are integrally rotatably coupled and a neutral position at which both the fifth speed gear stage 17e and the sixth speed gear stage 17f are released without being coupled with the gearshift shaft 22.

The main shift operation lever 45 is connected with a shifter arm 45c through a rod part 45a, a link mechanism 45b and the like. At the state where the main shift operation lever 45 is located at the neutral position (a central position in FIG. 20), the shifter arm 45c is engaged with an engaging recess 59b (refer to FIG. 23) of a boss part 59a (refer to FIG. 23) of the shifter stay 59. When the main shift operation lever 45 falls down leftwards in the vehicle width direction from the neutral position state, the shifter arm 45c is engaged with an engaging recess 58b (refer to FIG. 23) of a boss part 58a (refer to FIG. 23) of the shifter stay 58. In the meantime, when the main shift operation lever 45 falls down rightwards in the vehicle width direction from the neutral position state, the shifter arm 45c is engaged with an engaging recess 60a (refer to FIG. 23) of the shifter stay 60.

At the state where the main shift operation lever 45 falls down leftwards in the vehicle width direction from the neutral position state and the shifter arm 45c is thus engaged with the engaging recess 58b, when the main shift operation lever 45 falls down further forwards in the front-rear direction, it is moved to the first speed gearshift position, so that it can move the shifter 61 to the first speed-side position together with the shifter stay 58. Thereby, the main shift operation lever 45 can switch the gearshift stage of the main change speed mechanism 17 to the first speed gear stage 17a. Also, at the state where the main shift operation lever 45 falls down leftwards in the vehicle width direction from the neutral position state and the shifter arm 45c is thus engaged with the engaging recess 58b, when the main shift operation lever 45 falls down further rearwards in the front-rear direction, it is moved to the second speed gearshift position, so that it can move the shifter 61 to the second speed-side position together with the shifter stay 58. Thereby, the main shift operation lever 45 can switch the gearshift stage of the main change speed mechanism 17 to the second speed gear stage 17a. Also, when the main shift operation lever 45 falls down forwards in the front-rear direction from the neutral position state (the state where the shifter arm 45c is engaged with the engaging recess 59b), it is moved to the third speed gearshift position, so that it can move the shifter 62 to the third speed-side position together with the shifter stay 59. Thereby, the main shift operation lever 45 can switch the gearshift stage of the main change speed mechanism 17 to the third speed gear stage 17c. Also, when the main shift operation lever 45 falls down rearwards in the front-rear direction from the neutral position state, it is moved to the fourth speed gearshift position, so that it can move the shifter 62 to the fourth speed-side position together with the shifter stay 59. Thereby, the main shift operation lever 45 can switch the gearshift stage of the main change speed mechanism 17 to the fourth speed gear stage 17d. Also, at the state where the main shift operation lever 45 falls down rightwards in the vehicle width direction from the neutral position state and the shifter arm 45c is thus engaged with the engaging recess 60a, when the main shift operation lever 45 falls down forwards in the front-rear direction, it is moved to the fifth speed gearshift position, so that it can move the shifter 63 to the fifth speed-side position together with the shifter stay 60. Thereby, the main shift operation lever 45 can switch the gearshift stage of the main change speed mechanism 17 to the fifth speed gear stage 17e. Also, at the state where the main shift operation lever 45 falls down rightwards in the vehicle width direction from the neutral position state and the shifter arm 45c is thus engaged with the engaging recess 60a, when the main shift operation lever 45 falls down further rearwards in the front-rear direction, it is moved to the sixth speed gearshift position, so that it can move the shifter 63 to the sixth speed-side position together with the shifter stay 60. Thereby, the main shift operation lever 45 can switch the gearshift stage of the main change speed mechanism 17 to the sixth speed gear stage 17f. In this way, the main shift operation lever 45 can switch the main change speed mechanism 17 to any one of the first speed gear stage 17a to the sixth speed gear stage 17f or to the neutral state, in correspondence to the main shift operation of an operator.

In the meantime, the engaging recess 60a is directly formed at the shifter stay 60. Meanwhile, the engaging recesses 58b, 59b are formed at the boss parts 58a, 59a that are formed separately from the bodies of the shifter stays 58, 59, and the boss parts 58a, 59a are respectively bolt-engaged and mounted to the bodies of the shifter stays 58, 59. Thereby, the main change speed mechanism 17 can improve the mounting abilities of the shifter stays 58, 59, 60, the engaging recesses 58b, 59b, 60a and the shifter arm 45c. As a result, it is possible to improve the productivity, which also improves the general versatility of the tractor 1.

The tractor 1 of this illustrative embodiment described above has the auxiliary change speed mechanism 18 including the first auxiliary change speed mechanism 24 that can speed-change the rotating power, which is transmitted from the engine 4 and is speed-changed in the main change speed mechanism 17, and then transmit the same to the rear wheels 3 and the second auxiliary change speed mechanism 25 that can speed-change the rotating power, which is speed-changed in the main change speed mechanism 17, to the lower speed than in the first auxiliary change speed mechanism 24 and then transmit the same to the driving wheels, the first auxiliary shift operation lever 49 that performs the first auxiliary shift operation of the first auxiliary change speed mechanism 24 and the second auxiliary shift operation lever 50 that is separately provided from the first auxiliary shift operation lever 49 and performs the second auxiliary shift operation of the second auxiliary change speed mechanism 25. Therefore, the tractor 1 can be configured so that a further gearshift stage can be easily added to the auxiliary change speed mechanism 18, and is easily provided with the further gearshift stage, which improves the general versatility.

In the meantime, the working vehicle of the above illustrative embodiment of the invention is not limited to the above illustrative embodiment and can be variously changed within the scope of the invention.

Figure 24:
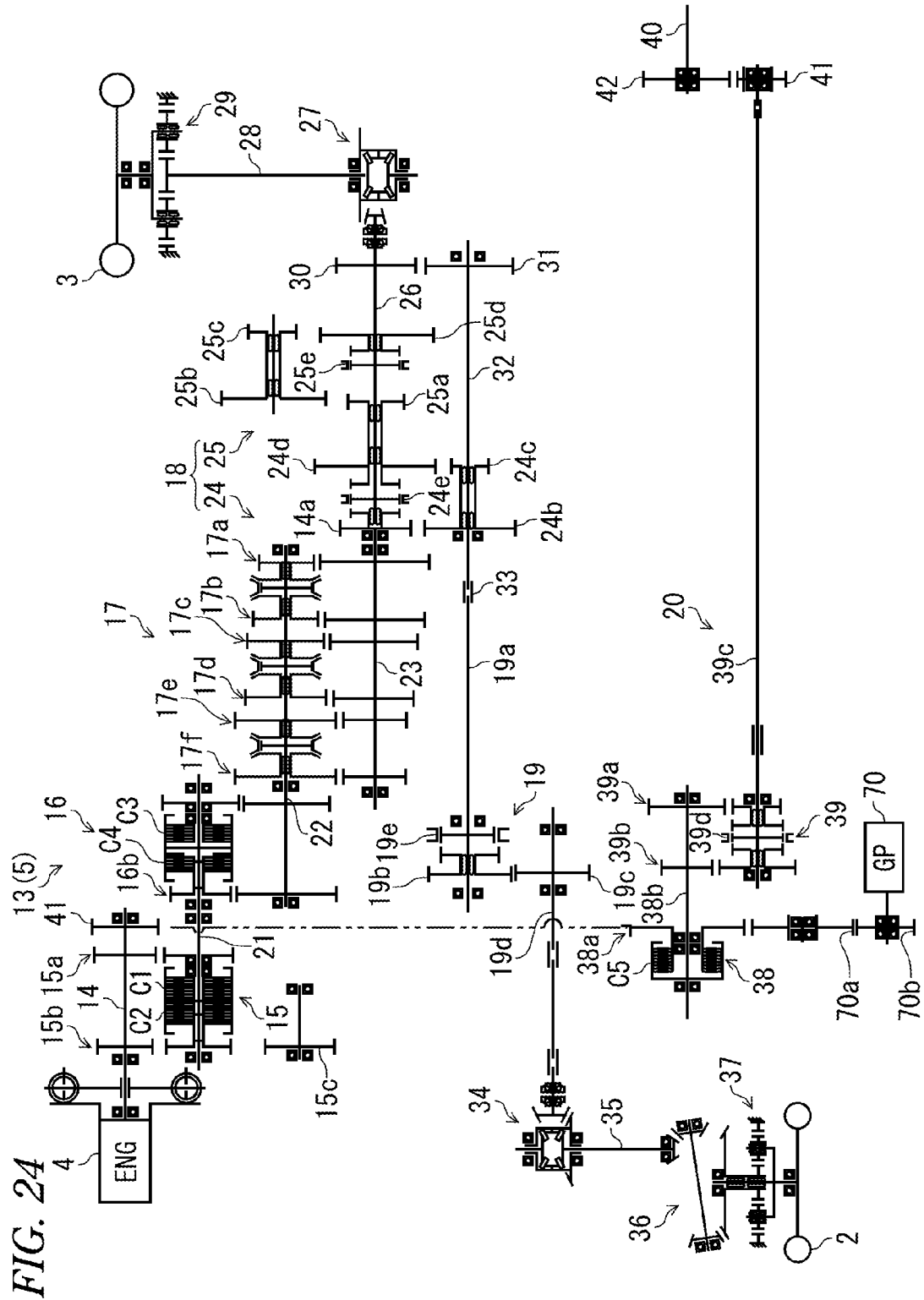
FIG. 24 is a line diagram showing a power transmission mechanism of a transmission of a tractor according to a modified embodiment.

In a modified embodiment shown in FIG. 24, the 2WD/4WD switching mechanism 19 of the power transmission mechanism 13 of the change speed device 5 adopts a mechanical switching type by the shifter 19e so as to reduce the cost, instead of the hydraulic multiple disc clutch type of the power transmission mechanism 13 shown in FIGS. 5 to 7B. That is, the 2WD/4WD switching mechanism 19 includes the transmission shaft 19a, the first gear 19b, the second gear 19c, the transmission shaft 19d and the shifter 19e. When the shifter 19e is at the 4WD position, the rotating power transmitted to the transmission shaft 19a is transmitted to the transmission shaft 19d through the first gear 19b and the second gear 19c. On the other hand, when the shifter 19e is at the 2WD position, the rotating power transmitted to the transmission shaft 19a is interrupted from being power-transmitted to the transmission shaft 19d. As a result, the tractor 1 can travel with the two-wheel driving.

Figure 25:
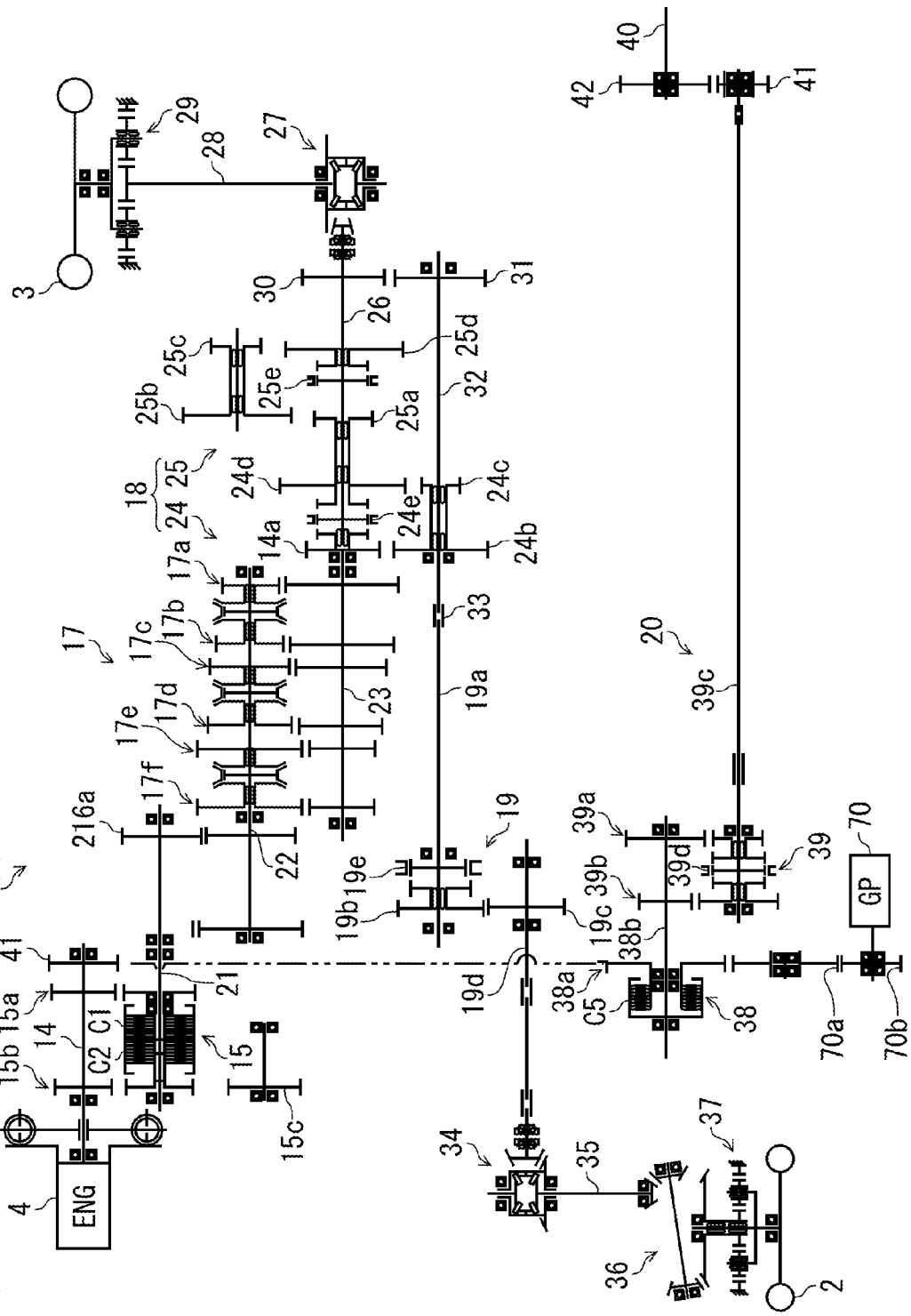
FIG. 25 is a line diagram showing a power transmission mechanism of a transmission of a tractor according to another modified embodiment.

Also, the power transmission mechanism 13 of the change speed device 5 according to a modified embodiment shown in FIG. 25 is not provided with the Hi-Lo change speed mechanism 16 (refer to FIGS. 5 to 7B) serving as the high-low change speed mechanism. The power transmission mechanism 13 is configured so that a gear 216a, which is integrally rotatably coupled with the counter shaft 21, and a gear 216b, which is integrally rotatably coupled with the gearshift shaft 22, are meshed with each other. In this case, the rotating power transmitted to the counter shaft 21 is transmitted to the gearshift shaft 22 through the gear 216a and the gear 216b.

As described above, according to the invention, the advancing and reversing switching mechanism 15 or high-low change speed mechanism (Hi-Lo change speed mechanism 16) is provided between the engine 4 and the main change speed mechanism 17, so that the clutches C1, C2, C3, C4 are arranged to the front transmission case 12F in the relatively high-rotating area. Therefore, it is possible to miniaturize the apparatus. Additionally, the clutches C6, C7 of the 2WD/4WD switching mechanism 19 and the clutch C5 of the PTO driving mechanism 20, which is operated in conjunction with the input shaft 14, are mounted to the front transmission case 12F, so that it is possible to intensively make the protection configuration and to easily perform a maintenance operation. Furthermore, all or a part of the clutches C1 to C7 is configured as the hydraulic multistage clutch type, so that the control clutch valve thereof is required. However, when the clutches are mounted to the sides of the front transmission case 12F, even though any configuration of forming the flow passage in the front transmission case 12F or providing the hydraulic piping thereto is adopted, it is possible to shorten the same, which reduces the cost.

What is claimed is:

1. A working vehicle comprising:
    front wheels;
    rear wheels;
    an engine;
    a transmission case including a front transmission case and a rear transmission case, and
    a power transmission mechanism, arranged in the transmission case, configured to transmit rotating power from the engine to the rear wheels or the front wheels and transmit the rotating power to an implement attached to a vehicle body, the power transmission mechanism including:
        an input shaft;
        a first switching mechanism configured to switch a rotation corresponding to the rotating power to rotation in advancing direction or reversing direction;
        a main change speed mechanism;
        an auxiliary change speed mechanism;
        a second switching mechanism configured to switch whether to transmit the rotating power to the front wheels or not; and
        a PTO driving mechanism, wherein
    a clutch of the first switching mechanism, a clutch of the second switching mechanism and a clutch of the PTO driving mechanism are arranged in the front transmission case.

2. The working vehicle according to claim 1, wherein:
    the power transmission mechanism is provided with a high-low change speed mechanism; and
    a clutch of the high-low change speed mechanism are arranged in the front transmission case.

3. The working vehicle according to claim 2, wherein the rotating power is transmitted through the input shaft connected to an output-side of the engine, the first switching mechanism, the high-low change speed mechanism, the main change speed mechanism, the auxiliary change speed mechanism and the second switching mechanism in corresponding order to drive the rear wheels or the front wheels.

4. The working vehicle according to claim 2, wherein:
    at least one of the clutch of the first switching mechanism, the clutch of the second switching mechanism, the clutch of the PTO driving mechanism or the clutch of the high-low change speed mechanism is a hydraulic multiple disc clutch; and
    clutch valves for control of the hydraulic multiple disc clutch are arranged on a side surface of the front transmission case.

5. The working vehicle according to claim 4, further comprising
    a gear pump provided on a side surface of the front transmission case.

6. The working vehicle according to claim 5, wherein the gear pump is driven by the rotating power transmitted through the input shaft and a gear group.

7. The working vehicle according to claim 6, further comprising:
    a transmission shaft for PTO gearshift input, configured to transmit the rotating power to a PTO transmission mechanism of the PTO driving mechanism, wherein
    the clutch of the PTO driving mechanism is provided between the PTO input gear and the transmission shaft.

8. The working vehicle according to claim 4, further comprising
    a fuel tank provided on a side of the front transmission case.

9. The working vehicle according to claim 4, further comprising:
    a gear pump provided on a side surface of the front transmission case; and
    a fuel tank provided on a side of the front transmission case.

10. The working vehicle according to claim 1, further comprising
    a spacer case, provided between the front transmission case and the rear transmission case of the transmission case, including a metal part configured to supporting gearshift shafts of the main change speed mechanism and a transmission shaft of the second switching mechanism.

* * * * *